US010528044B2

(12) United States Patent
Emura et al.

(10) Patent No.: US 10,528,044 B2
(45) Date of Patent: Jan. 7, 2020

(54) VEHICLE CONTROL DEVICE, VEHICLE CONTROL METHOD, AND VEHICLE CONTROL PROGRAM

(71) Applicant: Panasonic Intellectual Property Management Co., Ltd., Osaka (JP)

(72) Inventors: Koichi Emura, Kanagawa (JP); Koji Arata, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 97 days.

(21) Appl. No.: 15/579,023

(22) PCT Filed: Jun. 1, 2016

(86) PCT No.: PCT/JP2016/002643
§ 371 (c)(1),
(2) Date: Dec. 1, 2017

(87) PCT Pub. No.: WO2016/199379
PCT Pub. Date: Dec. 15, 2016

(65) Prior Publication Data
US 2018/0113454 A1    Apr. 26, 2018

(30) Foreign Application Priority Data

Jun. 11, 2015    (JP) .................................. 2015-118633

(51) Int. Cl.
*G05D 1/00* (2006.01)
*B60W 50/08* (2012.01)
(Continued)

(52) U.S. Cl.
CPC ......... *G05D 1/0061* (2013.01); *B60W 50/082* (2013.01); *B60W 50/14* (2013.01);
(Continued)

(58) Field of Classification Search
CPC ...... B60W 10/04; B60W 10/18; B60W 10/20; B60W 30/182; B60W 50/082; B60W 50/14; G05D 1/0088; G06K 9/00845
(Continued)

(56) References Cited

FOREIGN PATENT DOCUMENTS

JP    10-329575 A    12/1998
JP    11-091397 A    4/1999
(Continued)

OTHER PUBLICATIONS

International Search Report of PCT application No. PCT/JP2016/002643 dated Aug. 16, 2016.

*Primary Examiner* — Maceeh Anwari
(74) *Attorney, Agent, or Firm* — Seed IP Law Group LLP

(57) ABSTRACT

A driver performs switching to a manual driving mode in a state that the driver is suitable for a driving operation. In a vehicle that is driven by a plurality of driving modes including a self-driving mode to be performed by a self-driving control unit and a manual driving mode in which a driver performs a part of or all of a driving operation, before the manual driving mode is started, information for presenting a request for operating by the driver from a user interface unit to the driver is output to the user interface unit. The input unit receives a signal based on the operation by the driver. A notification unit notifies a self-driving control unit of a switching signal for instructing switching to the manual driving mode when a difference between a value obtained from the signal based on the operation by the driver, the signal having been input from the input unit and a reference value according to the operation request is within an allowable range.

11 Claims, 14 Drawing Sheets

(51) Int. Cl.
 B60W 50/14 (2012.01)
 G06K 9/00 (2006.01)
(52) U.S. Cl.
 CPC ....... G05D 1/0088 (2013.01); G06K 9/00845 (2013.01); *B60W 2050/146* (2013.01); *G05D 2201/0213* (2013.01)
(58) Field of Classification Search
 USPC .......................................................... 701/23
 See application file for complete search history.

(56) References Cited

FOREIGN PATENT DOCUMENTS

| | | | |
|---|---|---|---|
| JP | 2007-196809 A | | 8/2007 |
| JP | 2007196809 A | * | 8/2007 |

* cited by examiner

FIG. 3

| Task/criterion ||||| 
|---|---|---|---|---|
| No | Type | Instruction value | Allowable lower limit | Allowable upper limit |
| 0001 | Steering | 90° | 80° | 100° |
| 0002 | Steering | 45° | 40° | 50° |
| 0003 | Steering | 180° | 160° | 200° |
| 0004 | Accelerator pedal | Full | −10° | 0° |
| 0005 | Accelerator pedal | Half | −30° | 30° |
| 0006 | Brake pedal | Full | −10° | 0° |
| 0007 | Brake pedal | Half | −30° | 30° |
| 0008 | Direction indicator | Right | N/A | N/A |
| 0009 | Direction indicator | Left | N/A | N/A |

VEHICLE CONTROL DEVICE, VEHICLE CONTROL METHOD, AND VEHICLE CONTROL PROGRAM

This application is a U.S. national stage application of the PCT international application No. PCT/JP2016/002643 filed on Jun. 1, 2016, which claims the benefit of foreign priority of Japanese patent application No. 2015-118633 filed on Jun. 11, 2015, the contents all of which are incorporated herein by reference.

TECHNICAL FIELD

The present invention relates to a vehicle control device, a vehicle control method, and a vehicle control program for switching a level of self-driving automation.

BACKGROUND ART

Recently, development related to self-driving automation for motor vehicles has been advanced. Automation levels defined by National Highway Traffic Safety Administration (NHTSA) in 2013 are classified into no automation (level 0), function-specific automation (level 1), combined function automation (level 2), limited self-driving automation (level 3), and full self-driving automation (level 4). The level 1 is a driving assistance system automatically performing one or more of acceleration, deceleration, and steering individually, and the level 2 is a driving assistance system automatically performing two or more of acceleration, deceleration, and steering in unison. In either case, driver intervention for a driving operation is required.

The automation level 4 is a full self-driving automation system automatically performing all of acceleration, deceleration, and steering, and the driver does not intervene the driving operation. The automation level 3 is a limited self-driving automation system automatically performing all of acceleration, deceleration, and steering, but the driver performs a driving operation according to need. The automation level changes according to a road environment. For example, during driving at the automation level 2, when a vehicle enters a section where a compartment line indicating a lane is faint, steering cannot be controlled in the vehicle. Then, the automation level immediately shifts to the automation level 1 in which only acceleration or deceleration for following a leading vehicle with a constant following-distance being kept is controlled. For example, when a self-driving specific lane ends 500 m away during driving at the automation level 3, the control of acceleration, deceleration, and steering is terminated. Since the automation level then shifts to the automation level 0, the vehicle requests a driver earlier to restart driving with a sufficient time allowance, and in response to the request, the driver drives the vehicle. As a result, the automation level shifts to the automation level 0. The shift of the automation level to a lower level when the vehicle is driven at the automation level 2 is called mode switching such that the self-driving mode in which the vehicle controls automatic driving is switched into a manual driving mode in which a driver performs a part or an entire part of a driving operation. Hereinafter, states of the automation level 2 and higher automation levels before mode switching are called a self-driving mode. A state in which the automation level is lower than before the mode switching after the mode switching is called a manual driving mode. As a method for switching the self-driving mode into the manual driving mode, there have been proposed a switching method using a switch or a panel operation, a method with which a driver directly operates an accelerator pedal, a brake pedal, and steering (overriding), and a method for detecting a state of a driving operation and switching a driving mode (for example, see PTL 1).

CITATION LIST

Patent Literature

PTL 1: Unexamined Japanese Patent Publication No. H10-329575

SUMMARY OF THE INVENTION

It is an object of the present invention to provide a technique of capable of switching a driving mode from a self-driving mode to a manual driving mode in a state that a driver is suitable for a driving operation.

A vehicle control device according to a certain aspect of the present invention includes an output unit, an input unit, and a notification unit. When an automation level of vehicle running is reduced, before a driver starts a part or all of a driving operation, the output unit outputs, to a user interface unit, information for presenting an operation request for an operation by the driver from the user interface unit to the driver. The input unit receives a signal based on the operation by the driver. The notification unit notifies a self-driving control unit of a switching signal for instructing switching of a driving mode when a difference between a value obtained from the signal based on the operation by the driver, the signal having been input from the input unit and a reference value according to the operation request is within an allowable range.

Any desired combinations of the above described components and modifications of the features of the present invention in devices, systems, methods, computer programs, a recording media containing the computer programs, or other entities are still effective as other aspects of the present invention.

According to the present invention, the driving mode can be switched from the self-driving mode to the manual driving mode in a state that the driver is suitable for the driving operation.

BRIEF DESCRIPTION OF DRAWINGS

FIG. 3 is a diagram illustrating an example of a task/criterion held in a determination unit.

DESCRIPTION OF EMBODIMENTS

Prior to describing exemplary embodiments of the present invention, problems of a conventional device will be briefly described. When a driver performs a switching operation or a steering operation by a constant amount or more during a self-driving mode, a self-driving controller can estimate that the driver has intention to switch the self-driving mode to a manual driving mode. However, when the self-driving mode continues for a long period, driver's tense feeling is decreased. Thus, frequently driver's posture is not kept and a reaction speed is decreased. When a driver whose reaction is slow is forced to make a quick response, the driver tends to perform an excessive operation. Further, when the driver is in one posture too long during the self-driving mode, driver's muscle is stiffened, and mostly a driver's action becomes slower in this situation.

Further, after the self-driving mode is switched to the manual driving mode, the driver cannot immediately capture an operation feeling, and an operation amount occasionally becomes too small or too large. Even when the driver has intention to operate, the driver is not occasionally in a situation such that the driver necessarily and sufficiently performs a driving operation. Further, even when the driver necessarily and sufficiently performs the driving operation, actions associated with the driving operation by a driver (excluding a direct driving operation) and a driver's posture are not necessarily suitable for the driving operation. The driving operation, the actions associated with the driving operation, and the driver's posture are defined as operations.

Hereinafter, exemplary embodiments of the present invention will be described with reference to the drawings.

First Exemplary Embodiment

Figure 1:
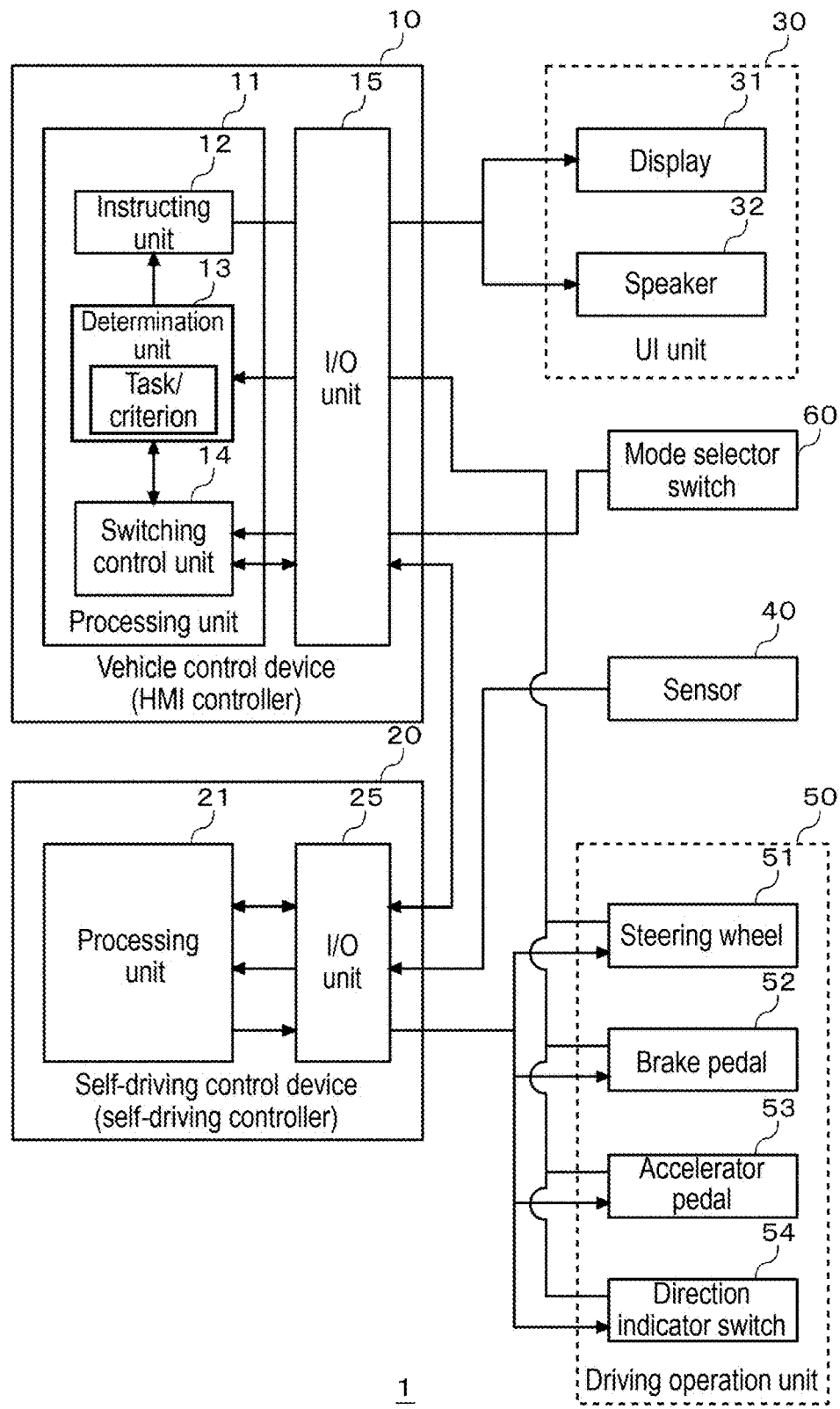
FIG. 1 is a block diagram illustrating a configuration of a vehicle according to a first exemplary embodiment.

FIG. 1 is a block diagram illustrating a configuration of vehicle 1 according to a first exemplary embodiment of the present invention, and a configuration relating to self-driving automation. Vehicle 1 having self-driving mode includes vehicle control device (HMI controller) 10, self-driving control device (self-driving controller) 20, user interface unit 30, sensor 40, driving operation unit 50, and mode selector switch 60.

User interface unit 30 includes display 31 and speaker 32. Display 31 visually notifies a driver of information. Display 31 may be a display of a car navigation device or a display audio device, or a headup display (HUD) that displays an image on a windshield. Further, display 31 may be a display of a smartphone or a tablet that is installed on a dashboard and operates in cooperation with vehicle control device 10. In the following description, a headup display (a windshield display) is assumed.

Speaker 32 auditorily notifies a driver of information. Speaker 32 may be a speaker of a car navigation device or a display audio device, or a speaker of a smartphone or a tablet that operates in cooperation with vehicle control device 10. Further, speaker 32 may be an exclusive speaker that outputs an in-vehicle announcement. Vehicle control device 10 and user interface unit 30 may be interconnected to each other by wire communication such as an exclusive line or a controller area network (CAN). Alternatively, they may be interconnected by wire communication or wireless communication such as a universal serial bus (USB), Ethernet (registered trademark), Wi-Fi (registered trademark), or Bluetooth (registered trademark).

Sensor 40 is a general term of various sensors for detecting a situation outside a vehicle and a position and a state of vehicle 1. Examples of sensors to be mounted for detecting the situation outside the vehicle include a camera, a millimeter-wave radar, light detection and ranging, laser imaging detection and ranging (LIDAR), an ambient temperature sensor, an atmospheric pressure sensor, a humidity sensor, and an illuminance sensor. Further, examples of sensors to be mounted for detecting the position and a state of vehicle 1 include a global positioning system (GPS), an acceleration sensor, a gyro sensor, a geomagnetic sensor, and an inclination sensor. A value detected by sensor 40 is output to self-driving control device 20. Sensor 40 and self-driving control device 20 are interconnected to each other by wire communication such as an exclusive line or a USB, an Ethernet (registered trademark), or a CAN.

Driving operation unit 50 includes, steering (steering wheel) 51, brake pedal 52, accelerator pedal 53, and direction indicator switch 54. In the self-driving mode according to the present exemplary embodiment, acceleration, deceleration, steering, and direction indicator blinking are targets for automatic control to be performed by self-driving control device 20. FIG. 1 illustrates an operation unit to be used for manually controlling them.

Steering 51 is an operation unit for steering the vehicle. When the driver rotates steering 51, an advancing direction of the vehicle is controlled via a steering actuator. The steering actuator can be electronically controlled by a steering electronic control unit (ECU).

Brake pedal 52 is an operation unit for decelerating vehicle 1. When the driver steps on brake pedal 52, the vehicle is decelerated via a brake actuator. The brake actuator can be electronically controlled by a brake ECU.

Accelerator pedal 53 is an operation unit for accelerating vehicle 1. When the driver steps on accelerator pedal 53, at least one of a revolution per minute of an engine and a revolution per minute of a motor is controlled via an accelerator actuator. The revolution per minute of an engine is controlled in a pure engine car, the revolution per minute of a motor is controlled in a pure electrically driven vehicle, and both of them are controlled in a hybrid automobile. The accelerator actuator can be electronically controlled by at least one of an engine ECU and a motor ECU.

Direction indicator switch 54 is an operation unit for blinking a direction indicator for notifying an outside of a direction of the vehicle. When the driver turns on/off direction indicator switch 54, the direction indicator turns on/off via a direction indicator controller. The direction indicator controller includes a drive circuit such as a relay that controls power feeding to a direction indicator lamp.

Self-driving control device 20 is connected with the steering ECU, the brake ECU, the engine ECU, the motor ECU, and the direction indicator controller by wire communication such as a CAN or an exclusive line. The steering ECU, the brake ECU, the engine ECU, the motor ECU, and the direction indicator controller transmit state signals representing states of the steering, the brake, the engine, the motor, and the direction indicator lamp, respectively, to self-driving control device 20.

In the self-driving mode, the steering ECU, the brake ECU, the engine ECU, and the motor ECU drive respectively actuators according to control signals supplied from self-driving control device 20. In a manual driving mode, a configuration may be such that an instruction is transmitted directly and mechanically to the respective actuators from steering 51, brake pedal 52, and accelerator pedal 53, or electronic control using the corresponding ECUs intervenes. The direction indicator controller turns on/off the direction indicator lamp according to a control signal supplied from self-driving control device 20 or an instruction signal from direction indicator switch 54.

Mode selector switch 60 is a switch to be operated by the driver and for switching between the self-driving mode and the manual driving mode. A switching signal from mode selector switch 60 is transmitted to vehicle control device 10 via a signal line. A configuration may be such that the mode can be switched by a special operation to be performed on driving operation unit 50 without providing mode selector switch 60. For example, during the self-driving mode, steering 51 may be rotated in a specific direction by a predetermined amount or more as the operation for switching from the self-driving mode to manual driving mode.

Self-driving control device 20 is the self-driving controller mounted with a self-driving control function, and includes processing unit 21 and input/output unit (I/O unit) 25. A configuration of processing unit 21 can be achieved by collaboration of hardware resources and software resources, or by hardware resources alone. Available hardware resources include a processor, a read only memory (ROM), a random access memory (RAM), and other large scale integrated circuit (LSI). Available software resources include a program such as an operating system, an application, or firmware. Input/output unit (I/O unit) 25 performs various communication controls according to various communication formats.

Vehicle control device 10 is a human machine interface (HMI) controller for executing a function of an interface between vehicle 1 and the driver and a function for deciding a driving mode, and includes processing unit 11 and input/output unit (I/O unit) 15. Processing unit 11 includes instructing unit 12, determination unit 13 and switching control unit 14, and can be achieved by collaboration of hardware resources and software resources, or by hardware resources alone. Available hardware resources include a processor, a ROM, a RAM, and other LSI. Available software resources include a program such as an operating system, an application, or firmware. Input/output unit (I/O unit) 15 performs various communication controls according to various communication formats.

Self-driving controller 20 and HMI controller 10 are connected directly by a signal line. Self-driving controller 20 and HMI controller 10 may be connected via a CAN. Further, self-driving controller 20 and HMI controller 10 can be integrated to configure one controller.

Processing unit 21 of self-driving controller 20 keeps track of a condition outside the vehicle, a position and a state of vehicle 1 based on a detected signal acquired from sensor 40 and state signals acquired from the respective ECUs. Processing unit 21 determines, based on the above information, whether self-driving automation can be performed. For example, on a road on which a lane is not drawn, it is difficult to specify a lane, and thus the self-driving automation is difficult. Further, also in a situation where a forward area cannot be clearly imaged due to heavy fog or heavy rain, the self-driving automation is difficult. When processing unit 21 of self-driving controller 20 determines that the self-driving automation is difficult, processing unit 21 notifies HMI controller 10 that the self-driving mode cannot be used.

When the self-driving automation is in an executable state and the self-driving mode is selected, processing unit 21 of the self-driving controller calculates a control value for controlling an automatic control target such as an advancing direction of a vehicle. In the calculation of the control value, various parameters collected from sensor 40 and various ECUs are applied to a self-driving algorithm. Processing unit 21 transmits the calculated control value to the ECU or the controller that is a target to be controlled. In the present exemplary embodiment, processing unit 21 transmits the calculated control value to the steering ECU, the brake ECU, the engine ECU, and the direction indicator controller. It is to be noted that, in an electrically driven vehicle or a hybrid automobile, processing unit 21 transmits the control value to the motor ECU in place of or in addition to the engine ECU.

In the following description, as the manual driving mode, a full-manual driving mode with which the driver controls all acceleration, deceleration, steering, and direction indicator blinking is assumed. However, the manual driving mode also includes a partial-manual driving mode with which some of them are manually controlled, and the rest of them are automatically controlled by self-driving controller 20. For example, such a partial-manual driving mode is a partial-manual driving mode with which steering and direction indicator blinking are manually controlled, and acceleration and deceleration are automatically controlled.

When continuance of the self-driving automation becomes difficult due to a change in a condition outside the vehicle during the self-driving mode, processing unit 21 of self-driving controller 20 notifies HMI controller 10 of an instruction signal for switching from the self-driving mode to the manual driving mode.

Switching control unit 14 of HMI controller 10 essentially decides a driving mode according to a switching signal from mode selector switch 60. When mode selector switch 60 selects the self-driving mode in the manual driving mode, switching control unit 14 notifies self-driving controller 20 of an instruction signal for instructing switching to the self-driving mode. When receiving the instruction signal, processing unit 21 of self-driving controller 20 determines whether the self-driving automation is in an executable state, and returns a determined result to HMI controller 10. Switching control unit 14 of HMI controller 10 outputs the determined result to user interface unit 30, and at least causes display 31 to display the determined result or causes speaker 32 to output the determined result as a voice.

When the manual driving mode is switched to the self-driving mode or the self-driving mode is selected at the time when the vehicle is actuated, the self-driving mode may be immediately started as long as the self-driving automation by self-driving controller 20 is in an executable state. On the other hand, when the self-driving mode is switched to the manual driving mode, the driver is not occasionally ready for driving. In this case, it is not desirable to immediately start the manual driving mode. Particularly when the self-driving mode is switched to manual driving mode due to the determination by self-driving controller 20, the driver is not occasionally ready for the driving. Further, even when the self-driving mode is switched to the manual driving mode with the intention of a driver, a driver who has not moved her/his body for a long time cannot immediately adapt herself/himself to the driving operation in some cases.

Accordingly, the present exemplary embodiment adopts a system for checking that a driver is ready for the driving operation and then switching to the manual driving mode when the self-driving mode is switched to the manual driving mode. A process for switching from the self-driving mode to manual driving mode to be executed by HMI controller 10 will be described in detail below. As a premise, also in the self-driving mode, a configuration where steering 51 rotates by a corresponding steering angle according to an automatic steering angle is assumed. In this configuration, an actuator that rotates steering 51 through control performed by the steering ECU is provided. The rotation of steering 51 according to actual running enables the driver to realize running of vehicle 1 also in the self-driving mode. Also as for brake pedal 52, accelerator pedal 53, and direction indicator switch 54, a configuration in which a corresponding amount and state are changed according to the automatic control performed by self-driving controller 20 is assumed.

Figure 2:
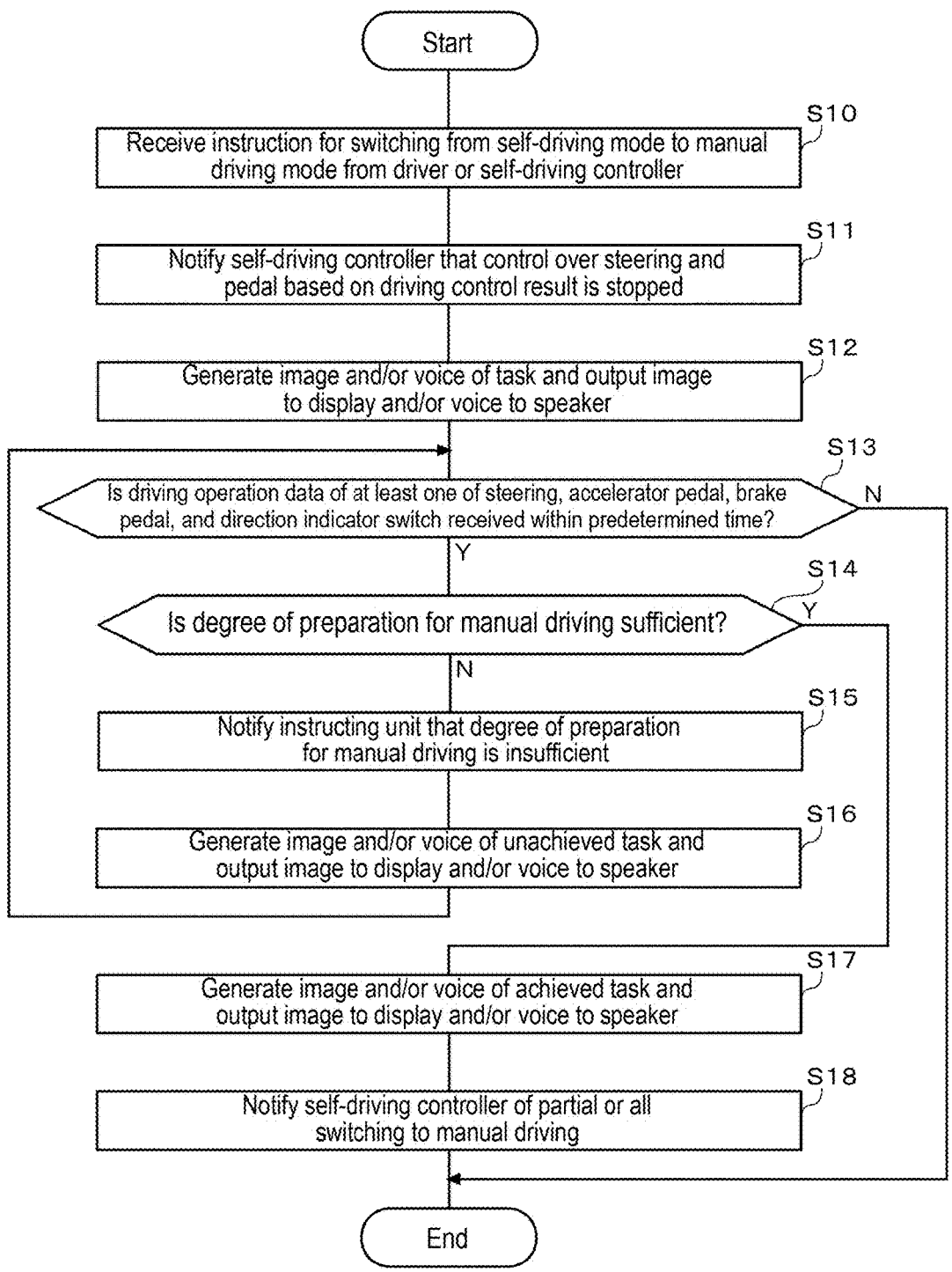
FIG. 2 is a flowchart for describing a process for switching from a self-driving mode to a manual driving mode through a human-machine interface (HMI) controller according to the first exemplary embodiment.

FIG. 2 is a flowchart for describing the process for switching from the self-driving mode to the manual driving mode through HMI controller 10 according to the first exemplary embodiment of the present invention. Switching control unit 14 of HMI controller 10 receives, from mode selector switch 60 (the driver) or self-driving controller 20, an instruction for switching from the self-driving mode to the manual driving mode (S10). Switching control unit 14 notifies self-driving controller 20 that control of steering 51 and accelerator pedal 53 based on a running control result is stopped (S11). Furthermore, switching control unit 14 notifies determination unit 13 of an instruction for starting a task for determining a degree of preparation for manual driving. Determination unit 13 notifies instructing unit 12 of an instruction for starting provision of the task for determining the degree of preparation for manual driving (corresponding to an operation request) to the driver. Determination unit 13 holds a task/criterion for determining the degree of preparation for manual driving.

FIG. 3 is a diagram illustrating an example of the task/criterion held in determination unit 13. FIG. 3 illustrates an example such that a plurality of tasks/criteria are held in a format of a table. For example, a first task is a task for rotating the steering by 90°, and a criterion for objective achievement is such that the rotation angle is made to range from 80° to 100°. When the rotation angle of the steering performed by the driver does not range from 80° to 100° during a task including a time when provision of the task is started, an objective is not achieved. The criterion may be described by an allowable difference value with respect to a target value (90°) such as ±10°. Fourth to seventh tasks relate to pressing amounts of accelerator pedal 53 and brake pedal 52, and their criteria are described as an allowable difference value with respect to target values. For example, in the fifth task, when the pressing amount of accelerator pedal 53 by the driver falls within a range of ±30° from a position where accelerator pedal 53 is half-pressed, the objective is achieved.

Details of processes for deciding a task to be presented by determination unit 13 and a task to be presented to the driver will be described later. A case where one task is presented to the driver is described below as an example. FIG. 3 illustrates an example where a plurality of tasks/criteria is retained in the format of a table, but tasks/criteria may be written into a program in advance.

The description returns to FIG. 2. Instructing unit 12 generates at least one of an image and a voice for presenting a task notified by determination unit 13 to the driver, and outputs at least one of the image and the voice to at least one of display 31 and speaker 32 (S12). At least one of display 31 and speaker 32 at least displays the image or outputs the voice. When the task is presented to the driver, the driver performs an operation corresponding to the task on driving operation unit 50. For example, the driver rotates steering 51 by a target angle presented as a steering task. Before switching to the manual driving mode, the operation on steering 51 performed by the driver does not affect an advancing direction of the vehicle.

As to the presented task, when receiving driving operation data based on a driving operation performed by the driver within a predetermined time (Y in S13), determination unit 13 compares the received driving operation data with criterion data of the task, and determines whether the degree of preparation for manual driving is sufficient (S14). For example, when, as to one presented task, a value of the operation data based on the operation performed by the driver is within a target zone of the criterion data of the task, the determination is made that the degree of preparation is sufficient (Y in S14), and when the value is out of the target zone, the determination is made that the degree of preparation is insufficient (N in S14). When not receiving the driving operation data within a predetermined time (N in S13), determination unit 13 regards the degree of preparation for manual driving as being insufficient, and terminates the process. The driving operation is performed on at least one of steering 51, brake pedal 52, accelerator pedal 53, and direction indicator switch 54.

When the determination is made in step S14 that the degree of preparation for manual driving is insufficient (N in S14), determination unit 13 notifies instructing unit 12 that the degree of preparation for manual driving is insufficient (S15). When receiving the notification, instructing unit 12 generates at least one of an image and a voice representing that an objective is not achieved and how much change the objective achievement needs, and outputs at least one of the image and the voice to at least one of display 31 and speaker 32 (S16). At least one of display 31 and speaker 32 at least displays an image or outputs a voice representing that the objective is not achieved and how much change the achievement needs.

Thereafter, returning to step S13, determination unit 13 waits for new driving operation data. After the determination is made in step S14 that the degree of preparation for manual driving is insufficient (N in S14), instructing unit 12 may again present the same task or may present another task. Further, when the objective is not achieved even if the driver tries to do a task repeatedly because the task is too difficult for the driver, for example, a difficulty level of the task may be reduced according to a number of repeating times. For example, when the task is to rotate steering 51 by 90°, a first criterion may be ±10°, a second criterion may be ±15°, and a third criterion may be ±20°.

When the driver cannot achieve the objective even if tasks are presented at a predetermined number of times, determination unit 13 decides continuation of the self-driving mode, and switching control unit 14 notifies self-driving controller 20 of an instruction signal for instructing the continuation of the self-driving mode. Self-driving controller 20 continues the self-driving mode when the self-driving automation is in an executable state. When the self-driving automation is in an executable state, self-driving automation may be continued until, for example, the vehicle arrives at a place where the mode can shift from the self-driving automation to the manual driving next time. When the self-driving automation is not in an executable state, the vehicle may be pulled over a shoulder, for example.

When the determination is made in step S14 that the degree of preparation for manual driving is sufficient (Y in S14), determination unit 13 notifies instructing unit 12 and switching control unit 14 that the degree of preparation for manual driving is sufficient. When receiving the notification, instructing unit 12 generates at least one of an image and a voice representing objective achievement, and outputs at least one of the image and the voice to at least one of display 31 and speaker 32 (S17). At least one of display 31 and speaker 32 at least displays the image or outputs the voice representing the objective achievement.

Switching control unit 14 notifies self-driving controller 20 of a switching signal for instructing partially or entirely switching from self-driving automation to manual driving (S18). When instructing the partial switching to the manual driving mode, switching control unit 14 notifies self-driving controller 20 of also a signal for instructing a restart of control over driving operation unit 50, which is not subject to manual driving, based on a running control result. When receiving the switching signal, self-driving controller 20 terminates the self-driving automation. Further, driving operation unit 50 (for example, brake pedal 52 and accelerator pedal 53) which is not subject to manual driving is present, the control over driving operation unit 50 based on the running control result is restarted.

The above description refers to the configuration that, also in the self-driving mode, driving operation unit 50 rotates by a corresponding steering angle according to a movement of an automatic steering angle, but driving operation unit 50 can be at a rest during the self-driving mode. In this case, the process in step S11 and the process in step S18 for notifying driving operation unit 50 of an instruction for restarting the control based on the running control result are not necessary. Further, an actuator for controlling driving operation unit 50 based on the running control result is not necessary.

Figure 4A:
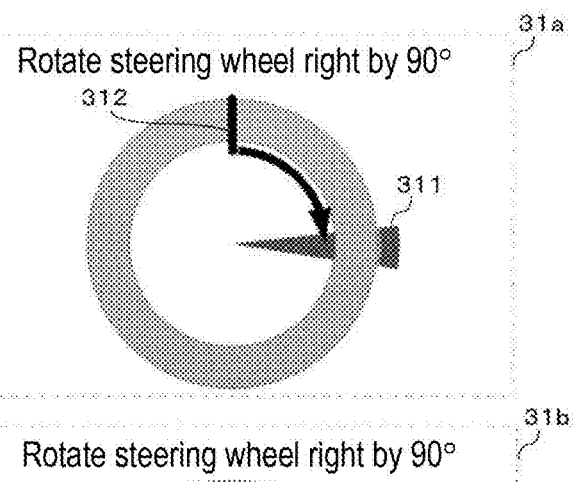
FIG. 4A is a diagram illustrating display example 1 of a task according to the first exemplary embodiment.
Figure 4B:
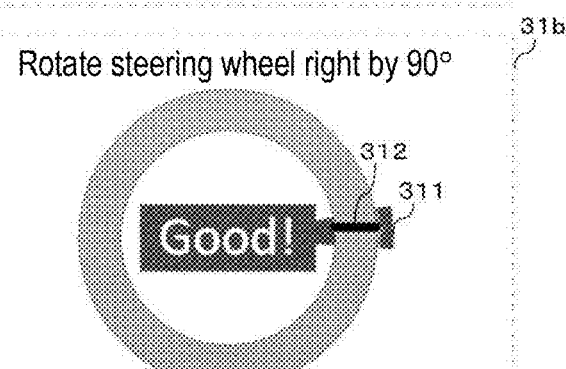
FIG. 4B is a diagram illustrating display example 1 of the task according to the first exemplary embodiment.
Figure 4C:
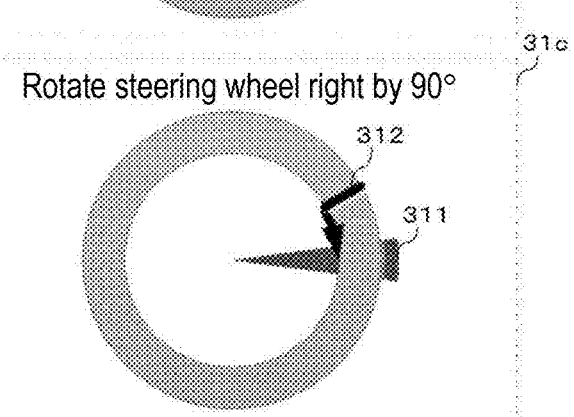
FIG. 4C is a diagram illustrating display example 1 of the task according to the first exemplary embodiment.

FIGS. 4A, 4B, and 4C are diagrams illustrating display example 1 of the task according to the first exemplary embodiment. The task illustrated in FIGS. 4A, 4B, and 4C is a task for rotating steering 51 right by 90°. FIG. 4A illustrates display example 31a when the task is instructed, FIG. 4B illustrates display example 31b when an objective is achieved, and FIG. 4C illustrates display example 31c when the objective is not achieved.

In display example 31a illustrated in FIG. 4A, a symbol of steering 51 is displayed on a center, and a message "rotate the steering wheel right by 90°" that is the task is displayed above the symbol. On the symbol of steering 51, gauge 312 indicating a current position of the steering, and target zone (80° to 100°) 311 are drawn in a superimposed manner. Gauge 312 that indicates the position of the steering moves according to an operation performed by the driver on steering 51. When the driver can rotate steering 51 within a range from 80° to 100°, the objective is achieved. As illustrated in FIG. 4B, gauge 312 indicating the position of the steering falls within target zone 311, and a message "Good!" indicating the objective achievement is displayed. When the objective is not achieved, the driver views gauge 312 indicating the position of the steering illustrated in FIG. 4C to check a relationship between a driver's operation and an actual position of the steering. The driver thus can recognize whether an operation amount is insufficient or too large, and can correct an operation feeling.

During execution of the steering task, steering 51 may be caused to display a target zone of a steering angle and an image showing a situation in the execution of the steering task. When a projector that can project the image on the position of steering 51 is used as user interface unit 30, the image can be displayed on steering 51. Further, steering 51 is provided with a light emitter such as an LED, and information including the steering task, the target zone of the steering angle, and the situation during the execution of the steering task may be informed by the light emitter.

Figure 5A:
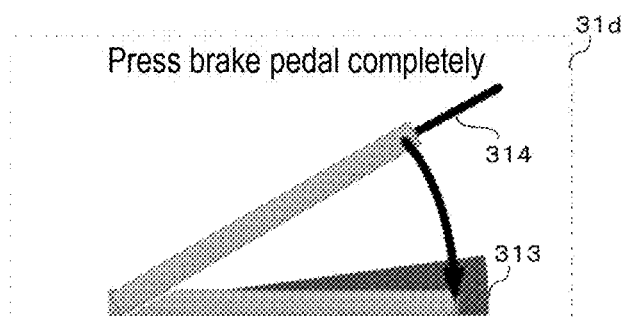
FIG. 5A is a diagram illustrating display example 2 of the task according to the first exemplary embodiment.
Figure 5B:
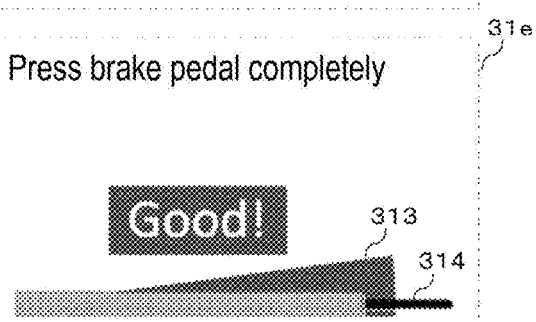
FIG. 5B is a diagram illustrating display example 2 of the task according to the first exemplary embodiment.
Figure 5C:
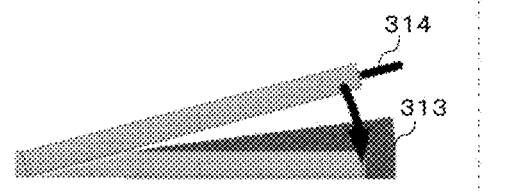
FIG. 5C is a diagram illustrating display example 2 of the task according to the first exemplary embodiment.

FIGS. 5A, 5B, and 5C are diagrams illustrating display example 2 of the task according to the first exemplary embodiment. The task illustrated in FIGS. 5A, 5B, and 5C is a task for completely pressing brake pedal 52. FIG. 5A illustrates display example 31d when the task is instructed, FIG. 5B illustrates display example 31e when an objective is achieved, and FIG. 5C illustrates display example 31f when the objective is not achieved.

In display example 31d illustrated in FIG. 5A, a symbol of brake pedal 52 is displayed on a center, and a task "Press the brake pedal fully" is displayed above the symbol. On a symbol of brake pedal 52, gauge 314 indicating a current position of the brake pedal and target zone (−10° to 0°) 313 are drawn in a superimposed manner. Gauge 314 that indicates the position of the brake pedal moves according to an operation performed by the driver on brake pedal 52. When the driver can press brake pedal 52 within a range of from −10° to 0°, an objective is achieved. As illustrated in FIG. 5B, gauge 314 indicating the position of the brake pedal falls within target zone 313, and a message "Good!" indicating the objective achievement is displayed. When the objective is not achieved, the driver views gauge 314 indicating the position of the brake pedal illustrated in FIG. 5C to check a relationship between a driver's operation and an actual position of the brake pedal. The driver thus can recognize whether an operation amount is insufficient or too large, and can correct an operation feeling.

As described above, according to the first exemplary embodiment, when the self-driving mode is switched to the manual driving mode, a determination is made whether a degree of preparation for a driver is sufficient. The switching to the manual driving mode is performed under a condition that the operation within the target zone can be performed and the degree of preparation is sufficient. Therefore, the driver can perform the switching to the manual driving mode while the driver is suitable for the driving, and can start manual driving more safely.

When the self-driving mode is switched to the manual driving mode, unlike the vehicle starting time, the driving is started from a state that vehicle 1 is running. Therefore, the driver should quickly regain the operation feeling. However, when a person sits on a seat for a long time without driving, the person tends to lack a tense feeling, have a bad posture, and be slow to respond to an external stimulus. When an external stimulus is generated in such a situation, the person occasionally overreacts in order to make up for a slow reaction speed. For example, when the driver finds an obstacle, the driver presses the brake pedal more strongly than necessity to brake hard.

On the contrary, according to the first exemplary embodiment, before switching to the manual driving mode, the driver performs an actual task using driving operation unit 50 such as steering 51. As a result, the driver let her/his body adjust to the driving operation, and can check sensitivities of the steering, the brake pedal and the accelerator pedal. Further, when the driver deals with the task, the driver is ready for driving. In the present exemplary embodiment, an automation level of NHTSA is used, and the present invention is not limited thereto.

Second Exemplary Embodiment

Hereinafter, a second exemplary embodiment will be described. A configuration of vehicle 1 according to the second exemplary embodiment is similar to the configuration of vehicle 1 according to the first exemplary embodiment illustrated in FIG. 1, and thus description thereof is omitted. In the first exemplary embodiment, prepared task/criterion has been used as task/criterion for checking the degree of preparation for a driver, but data during actual running is used in the second exemplary embodiment.

Figure 6:
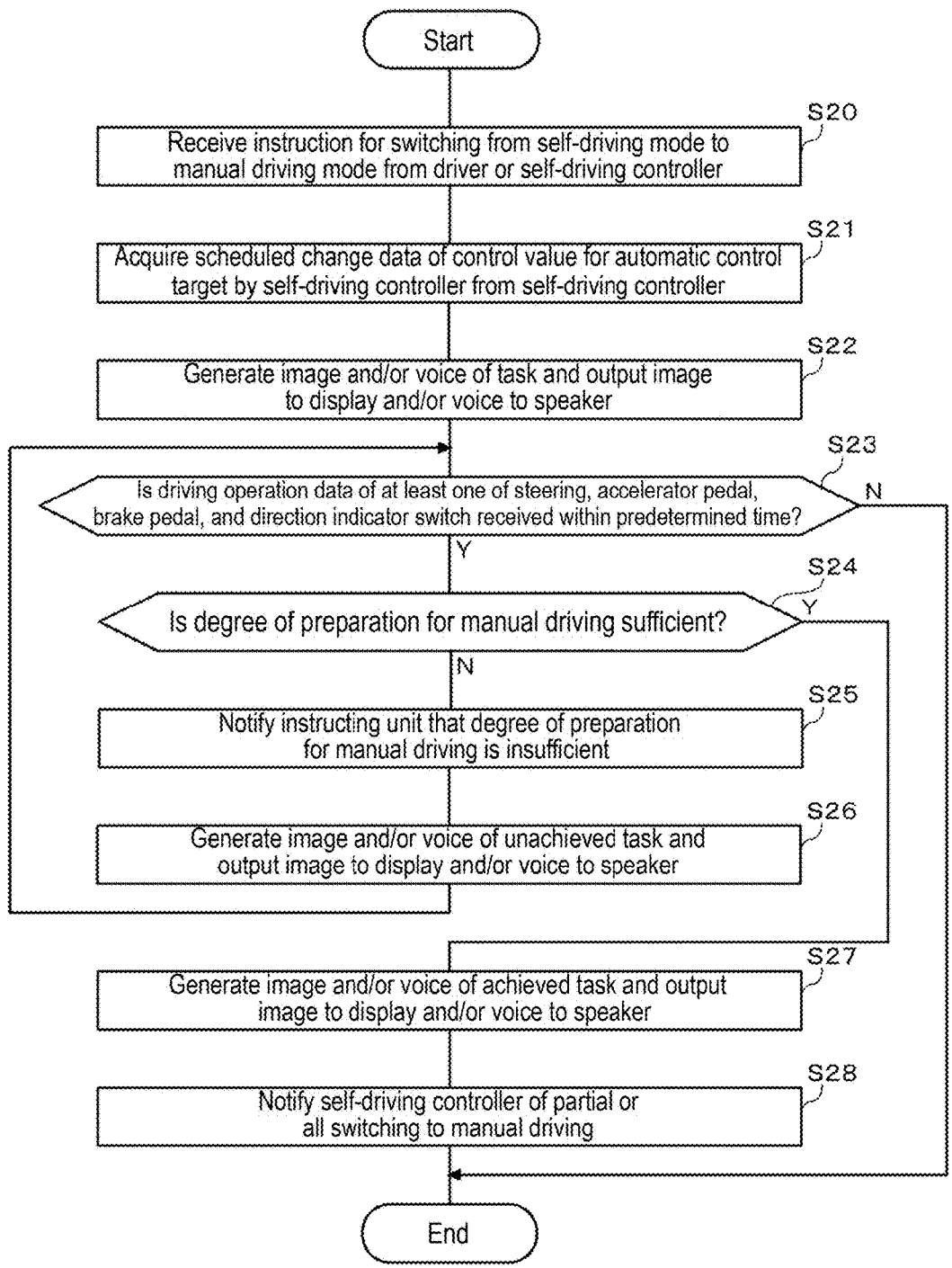
FIG. 6 is a flowchart for describing a process for switching from the self-driving mode to the manual driving mode through the HMI controller according to a second exemplary embodiment.

FIG. 6 is a flowchart for describing a process for switching from the self-driving mode to the manual driving mode through HMI controller 10 according to the second exemplary embodiment of the present invention. Switching control unit 14 of HMI controller 10 receives, from mode selector switch 60 (the driver) or self-driving controller 20, an instruction for switching from the self-driving mode to the manual driving mode (S20). In the second exemplary embodiment, even when self-driving controller 20 controls driving operation unit 50 based on a running control result, the control does not have to be stopped.

Switching control unit 14 acquires scheduled change data of a control value for a target to be automatically controlled by self-driving controller 20 (for example, a steering angle) from self-driving controller 20 (S21). Self-driving controller 20 calculates a scheduled change of the control value of each automatic control target based on a situation outside the vehicle, a position and a state of vehicle 1. Self-driving controller 20 calculates scheduled changes of, for example, the respective control values of a steering angle, a pressing amount of the brake pedal, and a pressing amount of the accelerator pedal during a time length from the present time to a certain time after the present time (for example, a few seconds later). The scheduled change values are occasionally changed depending on a change of a situation. For example, when a pedestrian runs out into a roadway, a control value of the pressing amount of the brake pedal is changed.

Switching control unit 14 notifies determination unit 13 of an instruction for starting a task for determining a degree of preparation for manual driving and the acquired scheduled change data of the control value. Determination unit 13 notifies instructing unit 12 of the instruction for starting presenting a task for determining a degree of preparation for manual driving to the driver and the acquired scheduled change data of the control value. The control value of the automatic control target corresponds to an operation amount for driving operation unit 50 in the manual driving mode. In the second exemplary embodiment, the task is such that the operation on driving operation unit 50 is adapted to actual running based on self-driving automation for a certain period. A criterion is such that when the driver can perform an operation without departing, for a certain period, from a target zone centered on a control value calculated by self-driving controller 20 at real time, an objective is achieved, but when departing from the target zone even once, the objective is not achieved.

Figure 7:
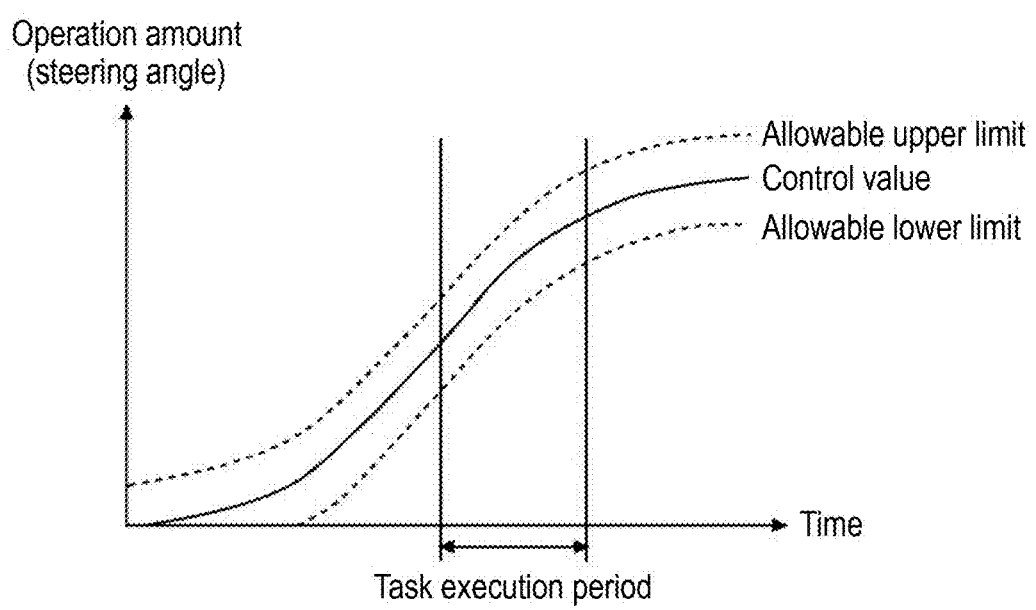
FIG. 7 is a diagram illustrating an example of a change in a control value and a target zone.

FIG. 7 is a diagram illustrating an example of the change in the control value and the target zone. For example, as to the control value of the steering angle, a control value +10° is an allowable upper limit, and a control value −10° is an allowable lower limit. A zone between the allowable upper limit and the allowable lower limit is the target zone. When a steering angle amount of steering 51 can be maintained within the target zone during an execution of a task (for example, 5 seconds), the objective is achieved. Further, similarly as to a control value of a pressing amount of the accelerator pedal, a control value +10° is an allowable upper limit, and a control value −10° is an allowable lower limit. A zone between the allowable upper limit and the allowable lower limit is the target zone. The pressing amount of accelerator pedal 53 can be maintained within the target zone during the execution of the task, an objective is achieved. The range of the target zone is one example, and may be widened or narrowed.

The task may be such that one component of driving operation unit 50 (for example, steering 51) is allowed to be adapted to actual driving for a certain time, or a plurality of components (for example, steering 51 and accelerator pedal 53) are allowed to be adapted to actual driving for a certain time. A design is such that when self-driving controller 20 controls driving operation unit 50 based on a running control result also during the execution of the task, a driver's operation enables overriding. In this case, the objective is achieved when the driver can perform an operation that follows a position of the steering or the pedal controlled for a certain time based on the running control result.

The description returns to FIG. 6. Instructing unit 12 generates at least one of an image and a voice for presenting a task for making driving operation unit 50 being adapted to the actual driving state to the driver, and outputs the image or the voice to at least one of display 31 and speaker 32 (S22). At least one of display 31 and speaker 32 at least displays the image or outputs the voice. When the task is presented, the driver operates driving operation unit 50 according to the actual driving state.

When determination unit 13 receives driving operation data for the presented task based on the driving operation performed by the driver within a predetermined time (Y in S23), determination unit 13 compares the received driving operation data with criterion data of the task to determine whether the degree of preparation for manual driving is sufficient (S24). When not receiving the driving operation data within the predetermined time (N in S23), determination unit 13 regards the degree of preparation for manual driving as being insufficient, and terminates the process. The driving operation is performed on at least one of steering 51, brake pedal 52, accelerator pedal 53, and direction indicator switch 54.

When determining in step S24 that the degree of preparation for manual driving is insufficient (N in S24), determination unit 13 notifies instructing unit 12 that the degree of preparation for manual driving is insufficient (S25). When receiving the notification, instructing unit 12 generates at least one of an image and a voice indicating that the objective is not achieved, and outputs the image or the voice to at least display 31 and speaker 32 (S26). At least one of display 31 and speaker 32 at least displays the image or outputs the voice indicating that the objective is not achieved.

Thereafter, the process returns to step S23, and determination unit 13 waits for new driving operation data. After the determination is made in step S24 that the degree of preparation for manual driving is insufficient (N in S24), in the second exemplary embodiment, basically the same task is again presented. It is preferable that a difficulty level of the task is set according to a driver's driving skill or a learning level of a system for shifting the driving operation from the self-driving automation to the manual driving (driving authority transfer). The difficulty levels of tasks may be reduced according to a number of repeating times so that in simpler configuration, drivers who have various driving skills or learning levels of the driving authority transfer can carry out the tasks at difficulty levels suitable for the drivers. As a result, a driver who has a high driving skill and a high learning level of the driving authority transfer can complete the task at a difficulty level equal to the first difficulty level of the task. Even when an objective is not achieved at the first difficulty level of the task, a driver, who has a low driving skill and a low learning level of the driving authority transfer, can achieve an object at a difficulty level equal to a driver's driving skill or a learning level of the driving authority transfer by reducing a second difficulty level of the task according to an degree of non-achievement. For example, a criterion of a target zone at a first time is a control value ±10°, a criterion at a second time is a control value ±15°, and a criterion at a third time is a control value ±20°. The criterion may be widened in such a manner.

When the driver cannot achieve the objective even if the driver performs the task at a predetermined number of times, determination unit 13 decides continuation of the self-driving mode, and switching control unit 14 notifies self-driving controller 20 of an instruction signal for instructing the continuation of the self-driving mode. When the self-driving automation is in an executable state, self-driving controller 20 continues the self-driving mode, and when the self-driving automation is in an executable state, self-driving controller 20 may continue the self-driving automation until, for example, the vehicle arrives at a position where the self-driving automation can be shifted to the manual driving next time. Alternatively, the self-driving automation is not in an executable state, the vehicle may be pulled over a shoulder, for example.

When the determination is made in step S24 that the degree of preparation for manual driving is sufficient (Y in S24), determination unit 13 notifies instructing unit 12 and switching control unit 14 that the degree of preparation for manual driving is sufficient. When receiving the notification, instructing unit 12 generates at least one of an image and a voice indicating an objective is achieved, and outputs the image or the voice to at least one of display 31 and speaker 32 (S27). At least one of display 31 and speaker 32 at least displays the image or outputs the voice representing the objective achievement.

Switching control unit 14 notifies self-driving controller 20 of a switching signal for instructing partially or entirely switching the self-driving automation to the manual driving (S28). In the second exemplary embodiment, control over driving operation unit 50 made by self-driving controller 20 based on the running control result is not stopped also during the execution of the task. Therefore, even when partial switching to the manual driving mode is instructed, the instruction for restarting the control based on the driving control result does not have to be notified.

Figure 8A:
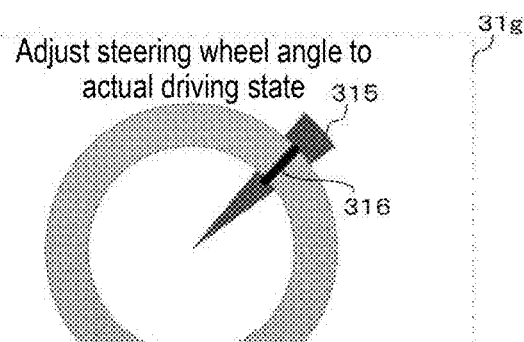
FIG. 8A is a diagram illustrating display example 1 of the task according to the second exemplary embodiment.
Figure 8B:
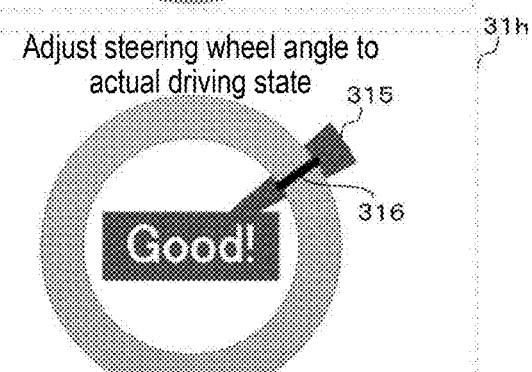
FIG. 8B is a diagram illustrating display example 1 of the task according to the second exemplary embodiment.
Figure 8C:
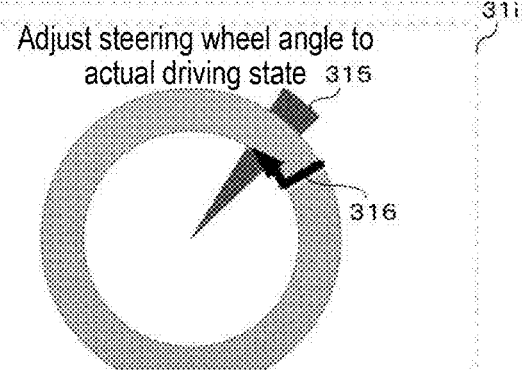
FIG. 8C is a diagram illustrating display example 1 of the task according to the second exemplary embodiment.

FIGS. 8A, 8B, and 8C are diagrams illustrating display example 1 of a task according to the second exemplary embodiment. The task illustrated in FIGS. 8A, 8B, and 8C is a task for adapting steering 51 to an actual driving state. FIG. 8A illustrates display example 31*g* when the task is instructed, FIG. 8B illustrates display example 31*h* when an objective is achieved, and FIG. 8C illustrates display example 31*i* when the objective is not achieved.

In display example 31*g* illustrated in FIG. 8A, a symbol of steering 51 is displayed on a center, and a message "Adjust the steering wheel angle to the actual driving state" that is the task is displayed above the symbol. On the symbol of steering 51, gauge 316 indicating a current position of the steering wheel, and target zone (control value ±10°) 315 are drawn in a superimposed manner. Gauge 316 that indicates the position of the steering moves according to an operation performed by the driver on steering 51. When the driver can hold steering 51 within a range of the target zone (control value ±10°) during the execution of the task of the steering operation, an objective is achieved. As illustrated in FIG. 8B, a message "Good!" indicating the objective achievement is displayed. When the objective is not achieved, the driver views gauge 316 indicating the position of the steering illustrated in FIG. 8C and target zone 315 to check a relationship between a driver's operation and a steering angle according to an actual driving state, and can correct an operation feeling. The example illustrated in FIG. 8C illustrates a state that the steering angle based on the control value according to the actual driving state returns to a left direction, but the driver cannot perform following of the position of steering 51 to the left direction.

Figure 9A:
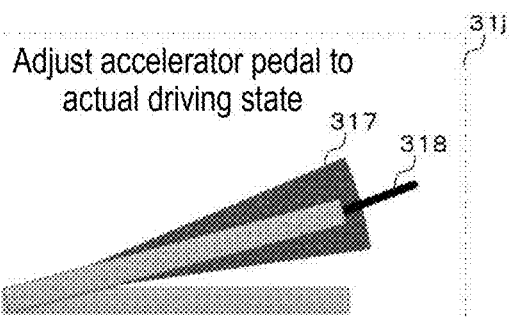
FIG. 9A is a diagram illustrating display example 2 of the task according to the second exemplary embodiment.
Figure 9B:
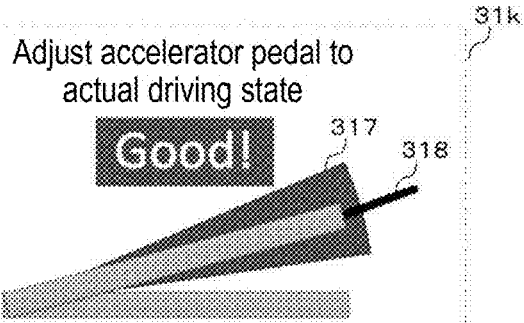
FIG. 9B is a diagram illustrating display example 2 of the task according to the second exemplary embodiment.
Figure 9C:
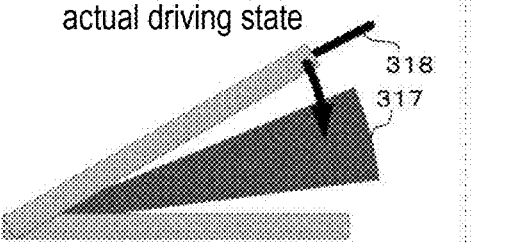
FIG. 9C is a diagram illustrating display example 2 of the task according to the second exemplary embodiment.

FIGS. 9A, 9B, and 9C are diagrams illustrating display example 2 of a task according to the second exemplary embodiment. The task illustrated in FIGS. 9A, 9B, and 9C is a task for adapting accelerator pedal 53 to an actual driving state. FIG. 9A illustrates display example 31*j* when the task is instructed, FIG. 9B illustrates display example 31*k* when an objective is achieved, and FIG. 9C illustrates display example 31*l* when the objective is not achieved.

In display example 31*j* illustrated in FIG. 9A, a symbol of accelerator pedal 53 is displayed on a center, and a message "Adjust the accelerator pedal to the actual driving state" that is the task is displayed above the symbol. On a symbol of accelerator pedal 53, gauge 318 indicating a current position of the accelerator pedal and target zone (control value ±10°) 317 are drawn in a superimposed manner. Gauge 318 that indicates the position of the accelerator pedal moves according to an operation performed by the driver on accelerator pedal 53. When the driver can hold accelerator pedal 53 within a range of the target zone (control value ±10°) during execution of the task, an objective is achieved. As illustrated in FIG. 9B, a message "Good!" indicating the objective achievement is displayed. When the objective is not achieved, the driver views gauge 318 indicating the position of the accelerator pedal illustrated in FIG. 9C and target zone 317 to check a relationship between a driver's operation and a pressing amount of the accelerator pedal according to an actual driving state, and can correct an operation feeling. The example illustrated in FIG. 9C illustrates a state where the driver releases accelerator pedal 53 even though the pressing amount of the accelerator pedal based on the control value according to the actual driving state is not hardly changed.

As described above, according to the second exemplary embodiment, when the self-driving mode is switched to the manual driving mode similar to the first exemplary embodiment, the switching to the manual driving mode can be performed more safely. Further, in the second exemplary embodiment, the driver deals with the task for adjusting driving operation unit 50 to an actual driving state, and thus can learn a practical operation. This enables the driver to have an operation feeling according to an actual driving state in advance. Further, since the self-driving mode is switched to the manual driving mode with the driver performing an operation according to an actual driving state, the mode can be switched more seamlessly.

Further, the first exemplary embodiment may be combined with the second exemplary embodiment. For example, after the determination in the first exemplary embodiment, the determination in the second exemplary embodiment is made. As a result, the driver can deal with the tasks for operations relating to the actual steering angle and the actual pressing amount of the brake pedal or the accelerator pedal step by step, and the switching to the manual driving can be performed by using the actual steering angle and the actual pressing amount of the brake pedal or the accelerator pedal. Therefore, the driver can take over the driving operation more smoothly.

Third Exemplary Embodiment

Hereinafter, a third exemplary embodiment will be described. In the first and second exemplary embodiments, the determination is made whether the driver can accurately operate driving operation unit 50 as the task for determining the degree of preparation for manual driving. In the third exemplary embodiment, a determination is made whether the driver can accurately perform an operation associated with the driving operation (excluding a direct operation on driving operation unit 50). For example, checks are made whether a situation outside the vehicle can be visually checked (whether a driver's face turns toward a notable target) with accuracy, a transverse feeding of steering 51 is appropriate, a gripping position of steering 51 is appropriate, no hands-free operation is performed, and a finger-pointing-and-call is done. Since most of these checks cannot be estimated from operation data from driving operation unit 50, a sensor that directly detects a state and a motion of the driver should be disposed.

Figure 10:
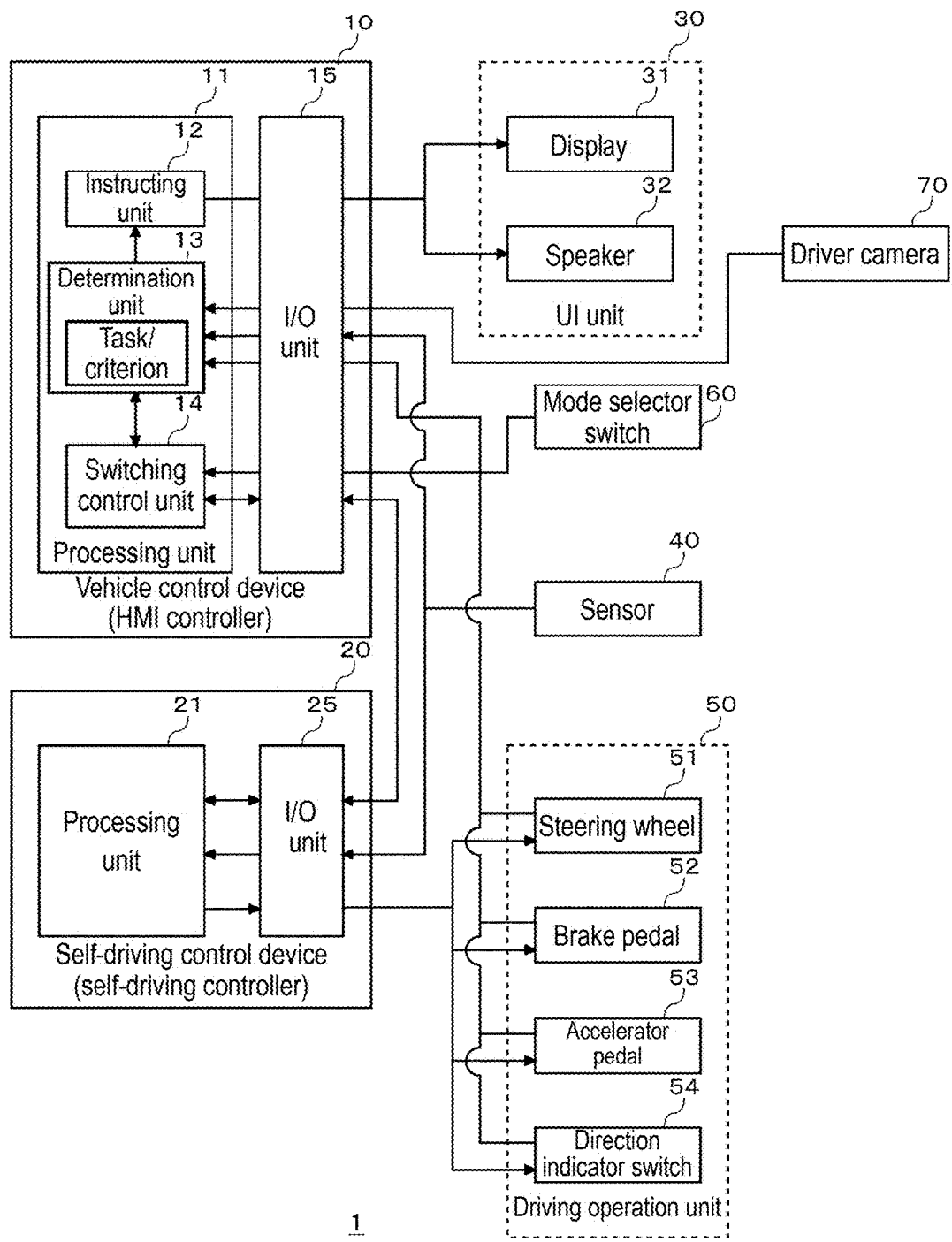
FIG. 10 is a block diagram illustrating a configuration of a vehicle according to a third exemplary embodiment.

FIG. 10 is a block diagram illustrating a configuration of vehicle 1 according to the third exemplary embodiment of the present invention. A configuration of vehicle 1 according to the third exemplary embodiment illustrated in FIG. 10 is such that driver camera 70 is added to the configuration of vehicle 1 according to the first exemplary embodiment illustrated in FIG. 1. Driver camera 70 is a camera for capturing an image of a driver, and is installed in a position where a driver's seat can be imaged. When the driver sits on the driver's seat, a driver's head portion or upper body is imaged.

Figure 11A:
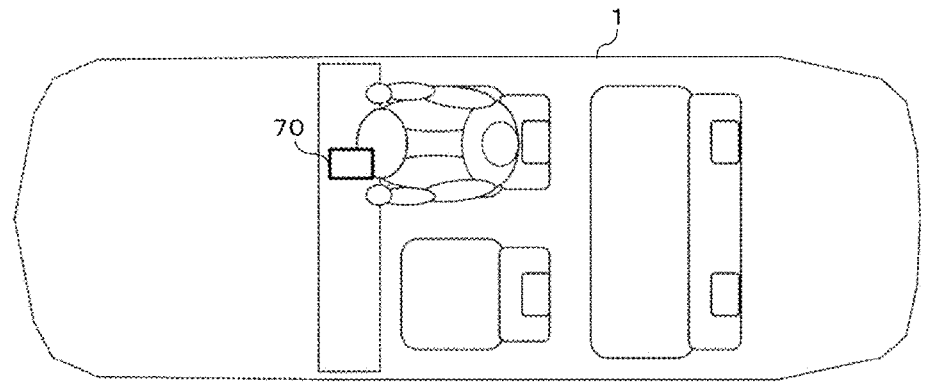
FIG. 11A is a diagram illustrating an installation example of a driver camera.
Figure 11B:
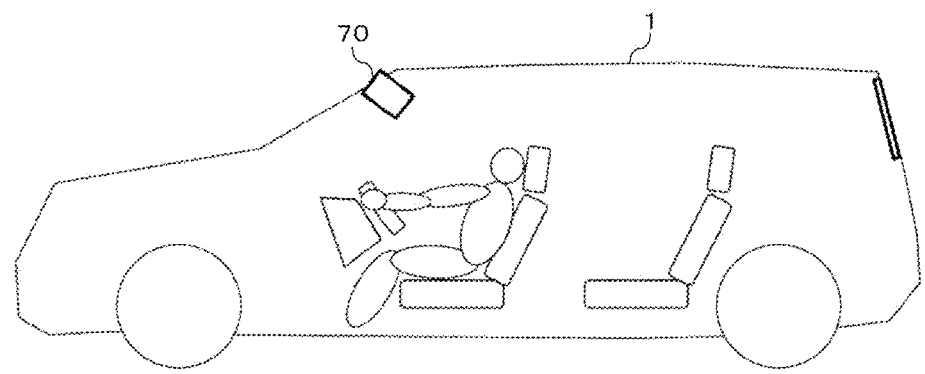
FIG. 11B is a diagram illustrating an installation example of the driver camera.

FIGS. 11A and 11B are diagrams illustrating an installation example of driver camera 70. FIG. 11A is a view of vehicle 1 from a top, and FIG. 11B is a view of vehicle 1 from a side. In examples illustrated in FIGS. 11A and 11B, driver camera 70 is installed on an upper portion of a windshield to look down the driver's seat. The installation position is not limited to the installation position illustrated in FIGS. 11A and 11B as long as a driver's face can be imaged.

Driver camera 70 includes a solid-state image sensing device such as a complementary metal oxide semiconductor (CMOS) image sensor or a charge-coupled device (CCD) image sensor, and outputs an image signal that is generated by photoelectric conversion in the solid-state image sensing device to HMI controller 10. Driver camera 70 may be a visible light camera, an infrared camera, or a combination of them. Further, a stereo camera or a camera adopting a time-of-flight (TOF) system may be used to acquire not only two-dimensional luminance information but also information about a distance between the camera and an object (depth information).

Determination unit 13 of HMI controller 10 according to the third exemplary embodiment includes an image recognition function. The following description refers to an example where determination unit 13 analyzes an image acquired from driver camera 70 and detects a face direction of a driver.

Figure 12:
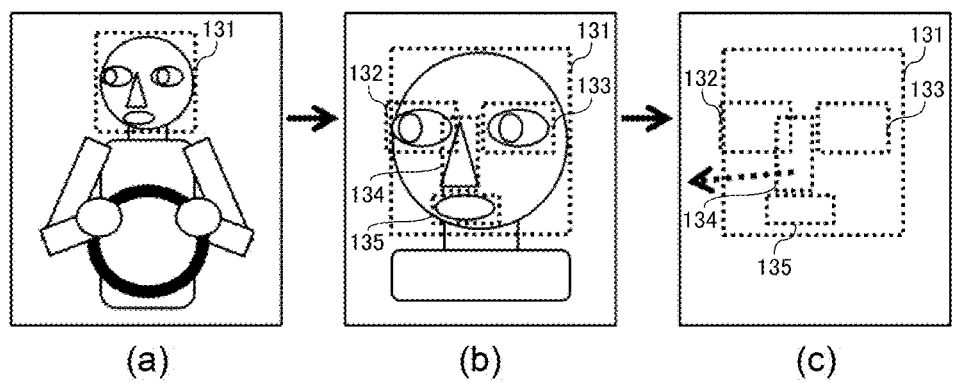
FIG. 12 is a diagram for describing an example of process for detecting a face direction by the determination unit.

FIG. 12 is a diagram for describing an example of a process for detecting a face direction by determination unit 13. An image illustrated in part (a) of FIG. 12 is an example of an image captured by driver camera 70. Determination unit 13 searches the image using a face recognition unit, and extracts face region 131. Determination unit 13 then searches face region 131 extracted by using an eye discriminator, a nose discriminator, and a mouth discriminator as illustrated in part (b) of FIG. 12, and detects right eye region 132, left eye region 133, nose region 134, and mouth region 135. Finally, determination unit 13, as illustrated in part (c) of FIG. 12, estimates a face direction of the driver based on a positional relationship among right eye region 132, left eye region 133, nose region 134, and mouth region 135 detected in face region 131. In part (c) of FIG. 12, the driver faces to the right with respect to an advancing direction. A face direction angle can be also detected based on positions of right eye region 132, left eye region 133, nose region 134, and mouth region 135 in face region 131.

Figure 13:
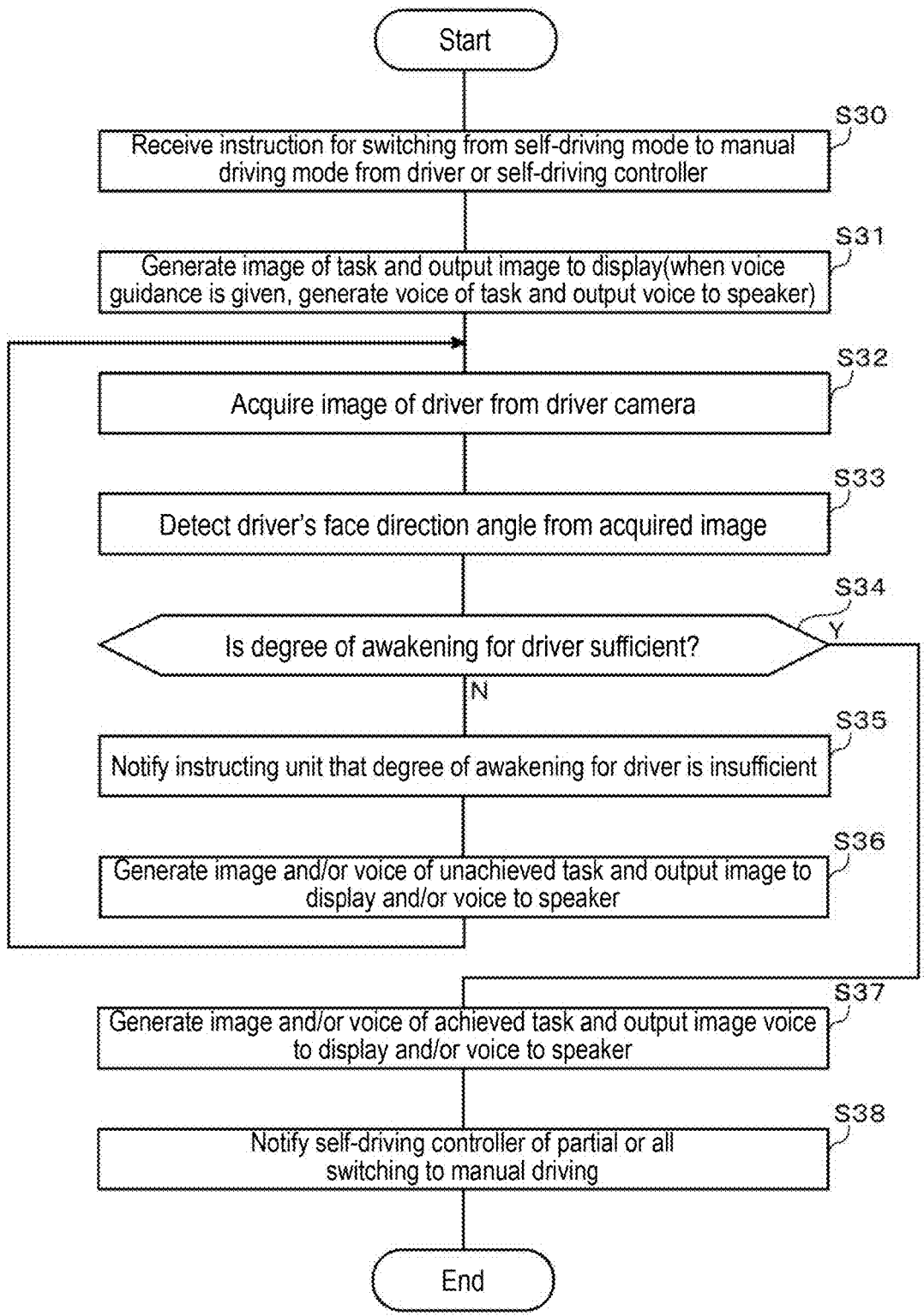
FIG. 13 is a flowchart for describing a process for switching from the self-driving mode to the manual driving mode through the HMI controller according to the third exemplary embodiment.

FIG. 13 is a flowchart for describing a process for switching from the self-driving mode to the manual driving mode through HMI controller 10 according to the third exemplary embodiment of the present invention. Switching control unit 14 of HMI controller 10 receives, from mode selector switch 60 (the driver) or self-driving controller 20, an instruction for switching from the self-driving mode to the manual driving mode (S30). Switching control unit 14 notifies determination unit 13 of an instruction for starting a task for determining a degree of awakening for a driver. Determination unit 13 notifies instructing unit 12 of the task for starting to present the task for determining the degree of awakening for the driver to the driver, and of display data according to target face direction angle change data.

The task in the description of this flowchart is to display a moving target on a headup display and check whether the driver can follow the target visually. In the third exemplary embodiment, determination unit 13 holds, as task/criterion, target face direction angle change data according to a movement of the target displayed on display 31. When a difference between the driver's face direction angle detected from a captured image and the target face direction angle is maintained within a predetermined range during execution of the task, an objective is achieved. However, when the difference exceeds the predetermined range, an objective is not achieved.

Instructing unit 12 generates an image for presenting to the driver based on the task and the display data notified by determination unit 13, and outputs the image to display 31 (S31). Display 31 displays the image. When voice guidance on task contents is given to the driver, instructing unit 12 generates a voice for the guidance and outputs the voice to speaker 32. When a target is displayed on display 31, the driver turns face to the target to visually recognize the target.

Figure 14A:
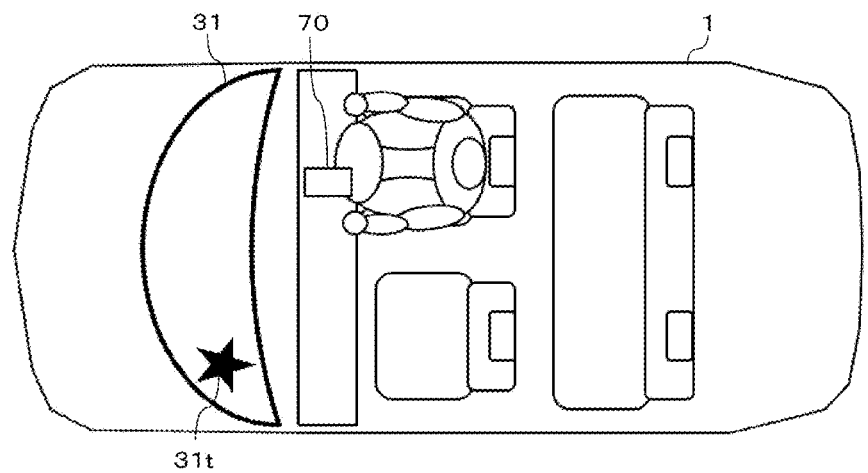
FIG. 14A is a diagram illustrating a display example of the task according to the third exemplary embodiment.
Figure 14B:
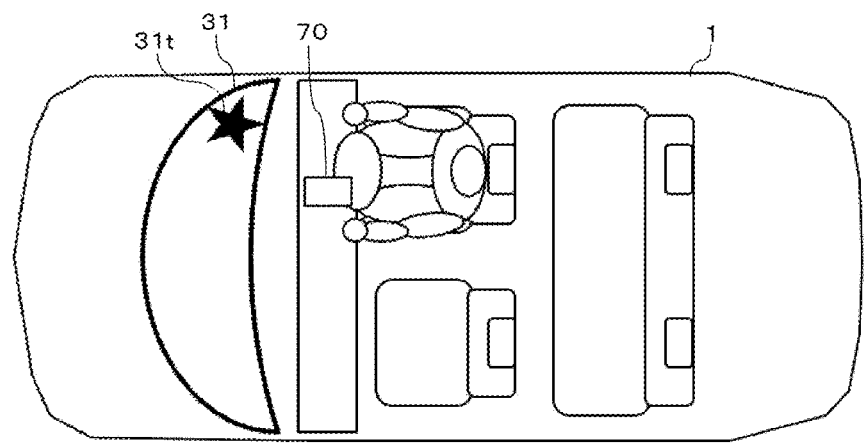
FIG. 14B is a diagram illustrating a display example of the task according to the third exemplary embodiment.

FIGS. 14A and 14B are diagrams illustrating display examples of a task according to the third exemplary embodiment. In the example illustrated in FIGS. 14A and 14B, a headup display is used as display 31, and target 31t is displayed on the headup display. Target 31t moves from a left end to a right end of the headup display. Further, target 31t may return from the right end to the left end. Before execution of this task, a message "Follow the star mark with your eyes" is given to the driver by means of at least one of characters and a voice. During execution of this task, driver camera 70 captures an image of the driver, and outputs the captured image to HMI controller 10.

The description returns to FIG. 13. Determination unit 13 of HMI controller 10 acquires the image of the driver from driver camera 70 (S32). Determination unit 13 detects a driver's face direction angle from the acquired image (S33). Determination unit 13 compares the face direction angle that has been detected (hereinafter, a detected face direction angle) with a target face direction angle, and determines whether a delay of the detected face direction angle from the target face direction angle is within a predetermined range. When the delay is within the predetermined range, the determination is made that the degree of awakening for the driver is sufficient (Y in S34), and when the delay deviates from the predetermined range, the determination is made that the degree of awakening for the driver is insufficient (N in S34).

Figure 15:
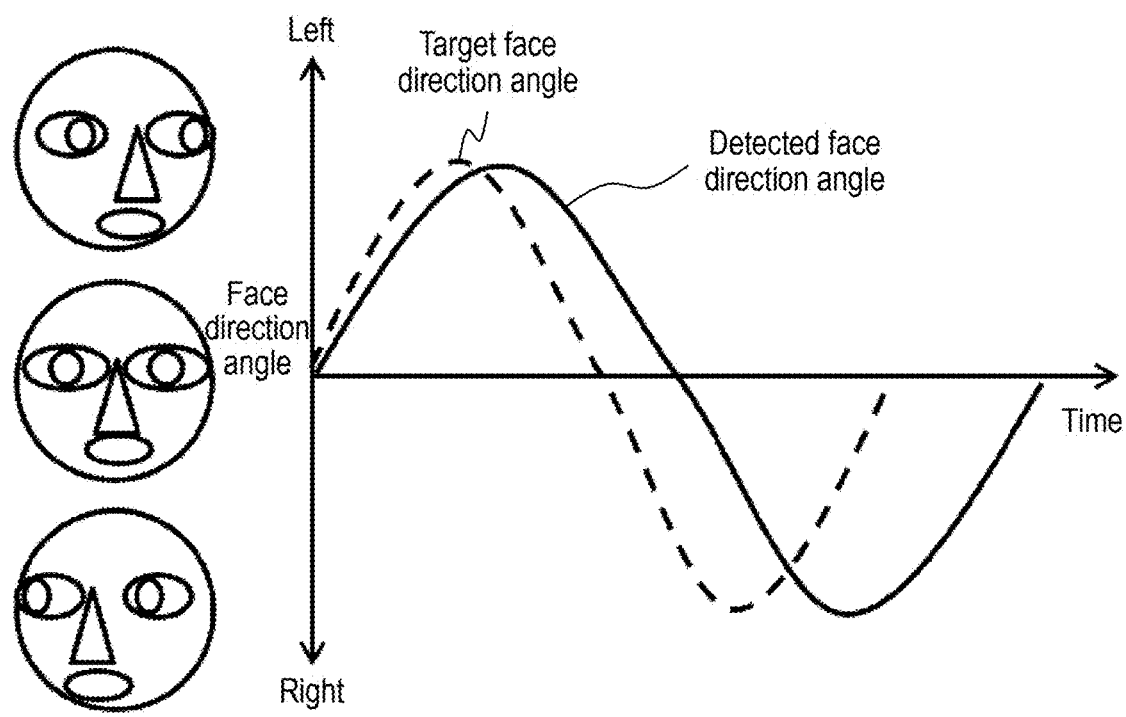
FIG. 15 is a diagram illustrating an example of changes in a detected face direction angle and a target face direction angle.

FIG. 15 is a diagram illustrating an example of changes in a detected face direction angle and a target face direction angle. Since a target is displayed before a driver's reaction, a detected face direction angle changes to be delayed from a target face direction angle. When this delay is a predetermined value or more, this means that the driver is slow to react, and the determination is made that the degree of awakening for the driver is insufficient. The predetermined value may be determined based on a reaction speed of an average driver or a reaction speed of a certain driver in a normal condition. In cases of aged drivers or drivers having slow reflexes, the predetermined value is increased and thus an allowable range of the delay may be widened within a range where safety is not deteriorated.

The description returns to FIG. 13. When determining in step S34 that the degree of awakening for the driver is insufficient (N in S34), determination unit 13 notifies instructing unit 12 that the degree of awakening for the driver is insufficient (S35). When receiving the notification, instructing unit 12 generates at least one of an image and a voice indicating that an objective is not achieved, and outputs the image or the voice to at least one of display 31 and speaker 32 (S36). At least one of display 31 and speaker 32 at least displays the image or outputs the voice indicating that the objective is not achieved.

Thereafter, returning to step S32, determination unit 13 acquires a new image of the driver. After the determination is made in step S34 that the degree of awakening is insufficient (N in S34), instructing unit 12 may present the same task again or present another task for a different movement of a target. The difficulty level of the task may be reduced according to a number of repeating times. For example, the allowable range of the delay may be widened.

When the driver cannot achieve an objective for all tasks even if the tasks are presented at a predetermined number of times, determination unit 13 decides continuation of the self-driving mode, and switching control unit 14 notifies self-driving controller 20 of an instruction signal for instructing the continuation of the self-driving mode. Self-driving controller 20 holds the self-driving mode when the self-driving automation is in an executable state, and the vehicle is pulled over a shoulder, for example, when the self-driving automation is not in an executable state.

When the determination is made in step S34 that the degree of awakening for the driver is sufficient (Y in S34), determination unit 13 notifies instructing unit 12 and switching control unit 14 that the degree of awakening for the driver is sufficient. When receiving the notification, instructing unit 12 generates at least one of an image and a voice indicating an objective is achieved, and outputs the image or the voice to at least one of display 31 and speaker 32 (S37). At least one of display 31 and speaker 32 at least displays the image or outputs the voice representing the objective achievement.

Switching control unit 14 notifies self-driving controller 20 of a switching signal for instructing partially or entirely switching the self-driving automation to the manual driving (S38). When receiving the switching signal, self-driving controller 20 terminates the self-driving automation. When the task according to the third exemplary embodiment and the task according to the first exemplary embodiment or the second exemplary embodiment are used in combination, switching control unit 14 notifies self-driving controller 20 of the switching signal under a condition such that the objectives of both the tasks are achieved.

As described above, according to the third exemplary embodiment, when the self-driving mode is switched to the manual driving mode, the determination is made whether the degree of awakening for the driver is sufficient, and allows the switching to manual driving mode under the condition that the objective is achieved. Therefore, the switching can be performed with driver's perception being suitable for the driving operation, and the switching to the manual driving mode can be performed more safely. Further, when the tasks according to the first exemplary embodiment or the second exemplary embodiment are used in combination, both a motion capability and a perceptual capability of the driver can be checked. Therefore, the switching to the manual driving mode can be performed more safely.

As described above, in the first exemplary embodiment or the second exemplary embodiment, the task for actually operating driving operation unit 50 is executed, and in the third exemplary embodiment, the task for performing the operation associated with driving is executed. In addition to these operation tasks and operation checking tasks, a posture checking task may be executed. The posture checking task is a task for checking whether a driver's posture is suitable for driving. In this task, a determination can be made whether a driver's posture is suitable for driving based on the image recognition described in the third exemplary embodiment.

For example, prior to the operation checking task according to the third exemplary embodiment, instructing unit 12 outputs a voice message "Adjust your posture" from speaker 32. Determination unit 13 checks an image of the driver captured by driver camera 70 after a predetermined time elapses from the output of the voice message against an image of the driver in an appropriate posture (hereinafter, a reference image). When the driver sleeps or falls forward, a position and a size of a driver's head portion in the captured image are greatly different from a position and a size of the head portion in the reference image. When a matching level of the captured image and the reference image is not smaller than a prescribed value, determination unit 13 determines that the driver's posture is appropriate for driving, and when the matching level of the captured image and the reference image is smaller than the prescribed value, determination unit 13 determines that the driver's posture is not appropriate for driving.

Further, the operation checking task according to the third exemplary embodiment and the posture checking task may be simultaneously executed. That is, in the operation checking task according to the third exemplary embodiment, when the captured image of the driver is analyzed, a driver's posture is also determined. Further, during execution of the operation checking task according to the first exemplary embodiment or the second exemplary embodiment, the driver may be imaged and a driver's posture may be determined. In these examples, presenting the message "Adjust your posture" to the driver may be omitted.

Difficulty Level of Task

The difficulty levels of the tasks presented to the driver in the operation task, the operation checking task, and the posture checking task described above will be described below. Although safety can be enhanced by setting the difficulty level of a task high, when the difficulty level is too high, convenience of the driver might be deteriorated. Therefore, the difficulty level should be adjusted so that both the safety and the convenience are well balanced.

First, a method for adjusting the difficulty level of a task will be described. It is considered that the method includes a method for adjusting task contents, a method for adjusting a criterion, and a method for adjusting a number of tasks and time necessary for achieving objectives. A following method can be considered as the method for adjusting task contents. In the operation task according to the second exemplary embodiment, a task for adapting only steering 51 to actual driving has a relatively low difficulty level. A task for adapting both steering 51 and accelerator pedal 53 to actual driving has a relatively high difficulty level.

For example, a following example is considered as the method for adjusting a criterion. In the operation task according to the first exemplary embodiment, adjustment of a target zone for the task for rotating steering 51 by 90° is changed from a range of 80° to 100° to a range of 75° to 105° has a low difficulty level. Adjustment of the target zone from a range of 80° to 100° to a range of 85° to 95° has a high difficulty level.

In the method for adjusting a number of tasks necessary for achieving an objective, a case where an objective is achieved by achieving one object has the lowest difficulty level. As the number of tasks necessary for achieving an objective is larger, the difficulty level becomes higher. For example, when the difficulty level of a task is heightened, all of the above-described operation task, the operation checking task, and the posture checking task are executed. When the difficulty level of a task is reduced, one or two of the tasks are omitted. For example, the posture checking task is omitted. Further, no task might be executed.

A standard for determining the difficulty level of a task will be described below. Determination unit 13 determines the difficulty level of a task to be presented to the driver based on at least one or any combination of a driving environment of vehicle 1, a state of vehicle 1, an attribute of a driver, a state of a driver, an operation by a driver, and a mode switching history.

As to the driving environment of vehicle 1, presence of recognition targets such as obstacles including another vehicle, a pedestrian, an animal, and a fallen object, a number of the recognition targets, a distance between vehicle 1 and a recognition target, a size of a recognition target, and a time to collision (TTC) with a recognition target are considered. The recognition targets are detected by sensor 40. Basically, as a possibility of the collision with the recognition target is lower, the difficulty level of a task is made to be lower. For example, when no recognition target is present, a task of the lowest difficulty level is selected. Specifically, when no vehicle is present around vehicle 1 on a linear freeway, the driving operation after switching to the manual driving is comparatively easy, and thus the difficulty level of the task is reduced. On the other hand, when a pedestrian or a bicycle is present around vehicle 1 or near a traffic intersection on a general road, the driving operation after switching of the manual driving is comparatively difficult, and thus the difficulty level of the task is heightened.

For the state of vehicle 1, for example, a current vehicle speed, a scheduled change in acceleration and deceleration, and a scheduled change in a steering angle are considered. In a state that a relatively high driving technique is required when a vehicle speed is fast or a tight curve is scheduled, the difficulty level of the task is heightened.

As the attribute of a driver, for example, an age of a driver or a driving experience is considered. The task before the switching to the manual driving mode is basically for checking whether a driver is in a normal state. In a case of an aged driver, a reaction speed and a motion capability are decreased in a normal state, and thus the difficulty level of the task is reduced within a range where safety is not deteriorated. As a result, a situation where the switching to the manual driving mode takes a long time to be performed can be avoided.

As to the state of a driver, a degree of awakening or inattentiveness is considered. For example, after an objective is achieved for the operation checking task relating to the degree of awakening according to the third exemplary embodiment, the operation task according to the first exemplary embodiment or the second exemplary embodiment is executed. In this case, the difficulty level of the operation task is adjusted according to a level of the objective achievement of the operation checking task. For example, an objective is barely achieved for the operation checking task, the difficulty level of the operation task is heightened.

As to the operation by a driver, for example, a steering direction and a steering amount of steering 51, a pressing amount of accelerator pedal 53, a pressing amount of brake pedal 52, and a state of direction indicator switch 54 are considered. For example, after an objective is achieved for the operation task according to the first exemplary embodiment or the second exemplary embodiment, the operation checking task according to the third exemplary embodiment is executed. In this case, the difficulty level of the operation checking task is adjusted according to a level of the objective achievement of the operation task. For example, when the objective is barely achieved for the operation checking task, the difficulty level of the operation checking task is heightened.

As to the mode switching history, for example, a duration of the latest self-driving mode is considered. As the duration of the self-driving mode is longer, a tense feeling of the driver tends to become lower. For example, when the duration of the latest self-driving mode is not less than a prescribed time (for example, 15 minutes), the difficulty level of the task is heightened. Further, for example, when the duration of the latest self-driving mode is short (for example, within 5 minutes), and the manual driving mode continues for a certain time or longer before the self-driving mode, the driver is considered to have a driving sense. In this case, the difficulty level of the task is reduced. For example, only the posture checking task may be executed. As an example of such a case, the switching to the self-driving mode is temporarily performed in order to talk on or transmit an e-mail through a mobile phone.

A designer structures an algorithm for deciding a task in consideration of the above-described the criterion for deciding the difficulty level of a task and adjusting method. The designer can freely select a reference in consideration with a contribution ratio and adopt an adjusting method according to a reference level.

The present invention has been described above according to the exemplary embodiments. It will be understood by those skilled in the art that these exemplary embodiments are merely examples, other exemplary modifications in which components and/or processes of the exemplary embodiments are variously combined are possible, and the other exemplary modifications still fall within the scope of the present invention.

For example, in the operation checking task and the posture checking task described above, driver camera 70 is used to detect a state of a driver. The state of a driver may be detected according to a method other than the image recognition. For example, a biosensor may be attached to a driver to estimate the degree awakening of the driver based on vital information such as a driver's heart rate. Further, a seating sensor may be provided to the driver's seat to estimate a driver's posture based on the detected value.

Note that the exemplary embodiments may be specified by items 1 to 11 described below.

Item 1

Vehicle control device (10) in a vehicle that is driven in a plurality of driving modes including a self-driving mode to be performed by a self-driving control unit and a manual driving mode in which a driver performs a part of or all of a driving operation, the vehicle control device including: output unit (15) that outputs, before the manual driving mode is started, to user interface unit (30), information for presenting an operation request for an operation by the driver from user interface unit (30) to the driver; input unit (15) that receives an input of a signal based on the operation by the driver, notification unit (15) that notifies self-driving control unit (20) of a switching signal for instructing switching to the manual driving mode when a difference between a value obtained from the signal based on the operation by the driver, the signal having been input from input unit (15) and a reference value according to the operation request is within an allowable range.

As a result, after a check is made that the driver is in a state suitable for manual driving, the self-driving mode can be switched to the manual driving mode, and thus safety can be enhanced.

Item 2

Vehicle control device (10) according to item 1, wherein output unit (15) outputs, to user interface unit (30), information for requesting the driver to perform a specific driving operation on driving operation unit (50), and input unit (15) receives an input of an operation signal from driving operation unit (50).

As a result, after a check is made that the driver is in a state that the operation on steering 51 can be suitably performed, the self-driving mode can be switched to the manual driving mode.

Item 3

Vehicle control device (10) according to item 2, wherein when driving operation unit (50) is operated in cooperation with the self-driving mode, notification unit (15) notifies self-driving control unit (20) of a signal for instructing driving operation unit (50) to stop the operation in cooperation with the self-driving mode.

The operation task using driving operation unit (50) can be easily executed by stopping the automatic driving of driving operation unit (50).

Item 4

Vehicle control device (10) according to any one of items 1 to 3, wherein output unit (15) outputs, to user interface unit (30), information for requesting the driver to perform the driving operation on driving operation unit (50) adapting to a running state of vehicle (1) operated by self-driving control unit (20) in the self-driving mode.

The driver can be made to have actual operation feeling in advance by executing the operation task according to actual driving.

Item 5

Vehicle control device (10) according to any one of items 1 to 4, wherein output unit (15) outputs, to the user interface unit (30), information for requesting the driver to perform a specific operation associated with the driving operation, input unit (15) receives an input of a signal from detector (70) for checking the specific operation associated with the driving operation by the driver.

As a result, after a check is made that the driver is in a state that the operation associated with the driving operation can be suitably performed, the self-driving mode can be switched to the manual driving mode.

Item 6

Vehicle control device (10) according to item 5, wherein output unit (15) outputs, to user interface unit (30), information for requesting the driver to look at a specific target, input unit (15) receives an input of an image from imaging unit (70) for imaging the driver, and notification unit (15), when a difference between a face direction angle of the driver estimated by analyzing the image acquired from imaging unit (70) and a target face direction angle according to a position of the specific target is within an allowable range, notifies self-driving control unit (20) of a switching signal for instructing the switching to an automation level.

After a check is made that the driver is in a state of a suitable perceptual capability by analyzing the captured image of the driver and detecting a reaction speed at which the driver visually captures a target, the self-driving mode can be switched to the manual driving mode.

Item 7

Vehicle control device (10) according to any one of items 1 to 6, wherein output unit (15) outputs, to user interface unit (30), information for requesting the driver to assume a posture suitable for driving, and, input unit (15) receives an input of a signal from detector (70) for detecting a state of the driver.

As a result, after a check is made that the driver is in a posture suitable for driving, the self-driving mode can be switched to the manual driving mode.

Item 8

Vehicle control device (10) according to any one of items 1 to 7, wherein a determination unit determines a difficulty level of the operation request based on at least one of a running environment, a state of the vehicle, an attribute of the driver, a state of the driver, the operation by the driver in response to the operation request, and an automation level switching history.

As a result, the task in which both safety and convenience are well balanced can be executed.

Item 9

Vehicle control device (10) according to any one of items 1 to 8, wherein the determination unit determines the difficulty level of the operation request according to a duration of a latest automation level.

For example, as a duration of the latest self-driving mode is longer, the difficulty level of the operation request may be made to be higher.

Item 10

A vehicle control method, in a vehicle that is driven in a plurality of driving modes including a self-driving mode to be performed by a self-driving control unit and a manual driving mode in which a driver performs a part or all of a driving operation, the vehicle control method including: outputting, to user interface unit (30), before starting the manual driving mode, information for presenting an operation request for an operation by the driver from the user interface unit (30) to the driver; receiving an input of a signal based on the operation by the driver; and notifying self-driving control unit (20) of a switching signal for instructing switching from the self-driving mode to the manual driving mode when a difference between a value obtained from an input signal based on the operation by the driver and a reference value according to the operation request is within an allowable range.

As a result, after a check is made that the driver is in a state suitable for manual driving, the self-driving mode can be switched to the manual driving mode, and thus safety can be enhanced.

Item 11

A vehicle control program in a vehicle that is driven in a plurality of driving modes including a self-driving mode to be performed by a self-driving control unit and a manual driving mode in which a driver performs a part or all of a driving operation, the vehicle control program for causing a computer to execute: a process for outputting, to user interface unit (30), before starting the manual driving mode, information for presenting an operation request for an operation by the driver from user interface unit (30) to the driver; a process for receiving an input of a signal based on the operation by the driver; and a process for notifying self-driving control unit (20) of a switching signal for instructing switching to the manual driving mode when a difference between a value obtained from an input signal based on the operation by the driver and a reference value according to the operation request is within an allowable range.

As a result, after a check is made that the driver is in a state suitable for manual driving, the self-driving mode can be switched to the manual driving mode, and thus safety can be enhanced.

INDUSTRIAL APPLICABILITY

The present invention is applicable to a vehicle having the self-driving mode.

REFERENCE MARKS IN THE DRAWINGS 1 vehicle
10 vehicle control device
11 processing unit
12 instructing unit
13 determination unit
14 switching control unit
15 input/output unit (I/O unit)
20 self-driving control device
21 processing unit
25 input/output unit (I/O unit)
30 user interface unit
31 display
32 speaker
40 sensor
50 driving operation unit
51 steering
52 brake pedal
53 accelerator pedal
54 direction indicator switch
60 mode selector switch
70 driver camera

The invention claimed is:

1. A vehicle control device which is configured to be coupled to a vehicle that is driven in a plurality of driving modes including a self-driving mode to be performed by a self-driving control unit and a manual driving mode in which a driver performs a part or all of a driving operation, the vehicle control device comprising:
   a processor; and
   a memory coupled to the processor, the memory storing a program that, when executed by the processor, causes the vehicle control device to:
      output, before the manual driving mode is started, to a user interface unit, information that presents an operation request for an operation by the driver, from the user interface unit to the driver, wherein the operation request identifies a task for determining a degree of the driver's preparation for manual driving;
      receive a signal based on the operation by the driver; and
      determine whether a difference between a value obtained from the signal based on the operation by the driver and a reference value according to the operation request is within an allowable range;
      notify the self-driving control unit of a switching signal configured to instruct switching to the manual driving mode when the difference is determined to be within the allowable range;
      determine a difficulty level of the task based on at least one of a running environment, a state of the vehicle, an attribute of the driver, a state of the driver, the operation by the driver in response to the task, or a mode switching history of the driving operation; and
      adjust the difficulty level of the task when the difference between the value obtained from the signal based on the operation by the driver and the reference value according to the operation request is not determined to be within the allowable range.

2. The vehicle control device according to claim 1, wherein the program, when executed by the processor, causes the vehicle control device to:
   output, to the user interface unit, information for requesting the driver to perform a specific driving operation on a driving operation unit, and
   receive an operation signal from the driving operation unit.

3. The vehicle control device according to claim 2, wherein when the driving operation unit is operated in cooperation with the self-driving mode, and the program, when executed by the processor, causes the vehicle control device to notify the self-driving control unit of a signal configured to instruct the driving operation unit to stop requesting the driver to perform the specific operation in cooperation with the self-driving mode.

4. The vehicle control device according to claim 1, wherein the program, when executed by the processor, causes the vehicle control device to output, to the user interface unit, information for requesting the driver to perform the driving operation on the driving operation unit based on a running state of the vehicle operated in the self-driving mode.

5. The vehicle control device according to claim 1, wherein the program, when executed by the processor, causes the vehicle control device to:
   output, to the user interface unit, information for requesting the driver to perform a specific operation associated with the driving operation, and
   receive a signal from a first detector for checking the specific operation associated with the driving operation by the driver.

6. The vehicle control device according to claim 5, wherein the program, when executed by the processor, causes the vehicle control device to:
   output, to the user interface unit, information for requesting the driver to look at a specific target,
   receive an image from an imaging unit for imaging the driver,
   determine whether the driver visually checks the specific target, based on the image acquired from the imaging unit, and
   when the driver is determined to have visually checked the specific target, notify the self-driving control unit of the switching signal configured to instruct the switching to the manual driving mode.

7. The vehicle control device according to claim 6, wherein the program, when executed by the processor, causes the vehicle control device to determine that the driver has visually checked the specific target when a difference between a face direction angle of the driver estimated by analyzing the image acquired from the imaging unit and a target face direction angle according to a position of the specific target is within an allowable range.

8. The vehicle control device according to claim 1, wherein the program, when executed by the processor, causes the vehicle control device to:
   output, to the user interface unit, information for requesting the driver to assume a posture suitable for driving, and
   receive a signal from a second detector for detecting a state of the driver.

9. The vehicle control device according to claim 1, wherein the program, when executed by the processor, causes the vehicle control device to determines the difficulty level of the task according to a duration of a latest driving operation.

10. A vehicle control method, in a vehicle that is driven in a plurality of driving modes including a self-driving mode to be performed by a self-driving control unit and a manual driving mode in which a driver performs a part or all of a driving operation, the vehicle control method comprising:
    outputting, to a user interface unit, before starting the manual driving mode, information that presents an operation request for an operation by the driver from the user interface unit to the driver, wherein the operation request identifies a task for determining a degree of the driver's preparation for manual driving;
    receiving a signal based on the operation by the driver;
    notifying a self-driving control unit of a switching signal configured to instruct switching to the manual driving mode when a difference between a value obtained from the signal based on the operation by the driver and a reference value according to the operation request is within an allowable range;
    determining a difficulty level of the task based on at least one of a running environment, a state of the vehicle, an attribute of the driver, a state of the driver, the operation by the driver in response to the task, or a mode switching history of the driving operation; and
    adjusting the difficulty level of the task when the difference between the value obtained from the signal based on the operation by the driver and the reference value according to the operation request is not determined to be within the allowable range.

11. A non-transitory recording medium storing a vehicle control program in a vehicle that is driven in a plurality of driving modes including a self-driving mode to be performed by a self-driving control unit and a manual driving mode in which a driver performs a part or all of a driving operation, the vehicle control program causing a computer:
    output, to a user interface unit, before starting the manual driving mode, information that presents an operation request for an operation by the driver from the user interface unit to the driver, wherein the operation request identifies a task for determining a degree of the driver's preparation for manual driving;
    receive a signal based on the operation by the driver;
    a self-driving control unit of a switching signal configured to instruct switching to the manual driving mode when a difference between a value obtained from the signal based on the operation by the driver and a reference value according to the operation request is within an allowable range,
    determine a difficulty level of the task based on at least one of a running environment, a state of the vehicle, an attribute of the driver, a state of the driver, the operation by the driver in response to the task, or a mode switching history of the driving operation; and
    adjust the difficulty level of the task when the difference between the value obtained from the signal based on the operation by the driver and the reference value according to the operation request is not determined to be within the allowable range.

* * * * *